United States Patent [19]

Higuchi et al.

[11] Patent Number: 4,976,377

[45] Date of Patent: * Dec. 11, 1990

[54] LIQUID AND POWDER MEASURING APPARATUS

[75] Inventors: Noboru Higuchi; Chuzo Kobayashi; Yasunori Ichikawa; Keizo Matsui; Shigeru Yamaguchi, all of Kanagawa, Japan

[73] Assignee: Fuji Photo Film Co., Ltd., Kanagawa, Japan

[*] Notice: The portion of the term of this patent subsequent to May 16, 2006 has been disclaimed.

[21] Appl. No.: 234,869

[22] Filed: Aug. 22, 1988

[30] Foreign Application Priority Data

Aug. 21, 1987 [JP] Japan .................................. 62-206587
Aug. 21, 1987 [JP] Japan .................................. 62-206588
Oct. 1, 1987 [JP] Japan .................................. 62-245755
Oct. 1, 1987 [JP] Japan .................................. 62-245757
Oct. 14, 1987 [JP] Japan .................................. 62-257393

[51] Int. Cl.$^5$ .............................................. B67O 5/08
[52] U.S. Cl. ........................................ 222/55; 222/56; 222/63; 222/29; 251/122; 137/487.5
[58] Field of Search ...................... 222/55, 56, 59, 63, 222/14-17, 20, 129; 251/210, 122; 137/403, 486, 487.5

[56] References Cited

U.S. PATENT DOCUMENTS

| | | | |
|---|---|---|---|
| 3,086,749 | 4/1963 | Frye | 251/210 |
| 3,122,272 | 2/1964 | Marsh | 222/135 |
| 3,521,853 | 7/1970 | Gillis, Jr. et al. | 251/210 |
| 3,700,005 | 10/1972 | Fletcher et al. | 251/122 |
| 3,855,458 | 12/1774 | Motter et al. | 222/55 |
| 4,222,448 | 9/1980 | Sunkle et al. | |
| 4,272,824 | 6/1981 | Lewinger et al. | 222/56 |
| 4,337,788 | 7/1982 | Seger | 251/122 |
| 4,362,033 | 12/1982 | Young | 222/64 |
| 4,406,313 | 9/1983 | Bennett et al. | 222/14 |
| 4,432,468 | 2/1984 | Siff et al. | 222/55 |
| 4,498,783 | 2/1985 | Rudolph | 222/56 |
| 4,514,092 | 4/1985 | Pritchard et al. | 222/64 |
| 4,629,392 | 12/1986 | Campbell et al. | 222/56 |
| 4,637,525 | 1/1987 | Miura et al. | |
| 4,720,076 | 1/1988 | Hyde | 251/122 |
| 4,777,585 | 10/1988 | Kokawa et al. | 364/513 |
| 4,830,508 | 5/1989 | Higuchi et al. | 222/56 |

FOREIGN PATENT DOCUMENTS 0290889 4/1988 European Pat. Off. .
158270 1/1983 Fed. Rep. of Germany .

OTHER PUBLICATIONS

Zadeh, L. A., "Outline of A New Approach to the Analysis of Complex Systems and Decision Processes", *IEEE Transactions*, vol. SMC-3, No. 1, pp. 28-44.

Mamdani, E. H., "Application of Fuzzy Algorithms for Control of Simple Dynamic Plant", *Proceedings, IEE*, vol. 121, No. 12 (Dec. 1974), pp. 1585-1588.

*Primary Examiner*—H. Grant Skaggs
*Assistant Examiner*—Steven Reiss
*Attorney, Agent, or Firm*—Sughrue, Mion, Zinn, Macpeak & Seas

[57] ABSTRACT

A liquid or powder measurement apparatus, usable also for mixing a plurality of measured materials and for distributing the mixture to a plurality of dispensing containers. A flow control valve having a wide flow rate range and excellent linearity between the degree of valve opening and flow rate is disposed in each of the liquid flow paths and is adjustable to have a flow rate linearly varying with the stroke of the valve. A mixing container receives the raw material from one or more supply containers and is weighed by a load cell to thereby detect the amount of material flowing into or out of the mixing container. A control unit operating according to fuzzy logic compares the measured weight with a target weight and accordingly adjusts the flow rate of a selected one of the flow regulators. The same load cell and control unit can also control the flows from the mixing containers to the dispensing containers.

11 Claims, 18 Drawing Sheets a: EQUAL PERCENT VALVE
b: LINEAR VALVE
c: VALVE OF INVENTION

LIQUID AND POWDER MEASURING APPARATUS

FIELD OF THE INVENTION

This invention relates to a liquid and powder measuring method and associated apparatus. It more particularly relates to a liquid and powder measuring method in which control, such as fuzzy inference, is carried out according to observation data obtained during the measurement, and the flow speed of a liquid or powder to be measured is gradually changed thereby to improve the measurement accuracy, to increase the range of measurement, and to realize a short measurement time.

The present invention also relates to a liquid measured mixing apparatus for mixing various kinds of raw-material liquids after metering to prepare a new mixture liquid.

The present invention relates to an apparatus for measured mixing and distributing liquids for respectively measuring and mixing various kinds of raw-material liquids to prepare a mixed liquid and for metrically distributing the mixture liquid to a plurality of tanks.

The present invention also relates to a liquid/powder metering-mixing-dispensing system for measuring various kinds of respective liquids and powders as raw materials, mixing these raw materials to newly prepare a mixed material, and dispensing the mixed liquid to dispensing containers. More particularly, the present invention relates to a liquid/powder measuring-mixing-dispensing system for measuring a wide flow rate change of liquids and powders as raw materials, mixing these raw materials and dispensing the mixture precisely and efficiently.

DESCRIPTION OF THE BACKGROUND

For the measurement of liquids, various detection methods such as a weight type detection method (load cells). pressure type detection method (differential pressure transmitters) and volume type detection method (oval flow meters) have been employed. For measurement of powders a weight type detection method using a load cell has been mainly employed.

In any one of the detection methods, it is an essential premise for measurement control that the flow speed is constant. A closed loop measurement control method in which the flow speed is continuously varied has not yet been proposed in the art.

In order to improve the measurement accuracy, the following methods have been employed.

In a first method, the flow speed in a flow control valve is changed in two steps so that, when the measurement target value is approached, the flow speed is switched over to a slow flow speed (c.f. Japanese Patent Application (OPI) No. 148019/1981). In a second method, an amount of inflow (or amount of head) is set as a measurement stopping condition, and the amount is predicted to suspend the measurement (c.f. Japanese Patent Application (OPI) No. 29114/1982). (The term "OPI" as used herein means an unexamined published application.)

In the conventional measurement control the flow speed is constant or it is switched in two steps as was described above. However, in a certain range, the measurement is carried out with the flow rate fixed. Therefore, the conventional measurement control suffers from the following disadvantages.

The first disadvantage is the measurement accuracy. The measurement accuracy may not be guaranteed because of the variation of flow speed which is caused by disturbance or by the variation of physical characteristic (such as viscosity) of the liquid.

For instance in the conveyance of a liquid by gravity, the residual amount of liquid to be measured remaining in the upstream container (referred to a "a head difference" in this specification) affects the flow speed of the liquid. If the head difference changes greatly, then the flow speed goes out of a certain range, thus adversely affecting the measurement accuracy. As a result, the head of the upstream container must be limited to remain in a narrow variation range. Therefore, in order to maintain the head difference in a predetermined range, it is necessary to suspend the measurement or to supply a suitable amount of raw material to the upstream container, with a secondary loss of raw material.

The second disadvantage is the measurement range. Since the flow speed is limited, the ratio of the minimum measurement value to the maximum measurement value is of the order of 1:5.

In the case where the flow speed is switched in two steps the ratio is of the order of 1:10 at maximum.

The reason why the measurement range must be narrow, as described above is as follows. Even if the measurement is suspended, some amount of liquid flows in because of the delay in response of the system. The amount of inflow is determined by the flow speed. Therefore in the case where the measurement target value is small, the amount of inflow exceeds the accuracy-guaranteed limit. As a result, the measurement range is limited.

In a plant which manufactures a variety of solutions, for one and the same raw material a measurement range of about 1:100 at maximum is available, and it is necessary to select a measuring apparatus in a range of measurement target values.

The third disadvantage is the measurement time. The measurement time depends on the measurement target value.

When the measuring target value is small, the measurement time is short: and when large, the measurement time is long.

When the measurement target value is small, the operation time of the system fluctuates and the measurement accuracy cannot be guaranteed, with the result that the measurement range is decreased.

In a system of mixing a plurality of measured solutions to prepare a new solution, the manufacturing capacity depends on the measurement time. Especially in a pipeless movement type manufacturing system, the conveying capacity is limited.

The above-described difficulties result in economical disadvantage in the formation of the production line. That is, heretofore, a number of liquid and powder measuring apparatus are installed according to measurement target values. Such a measuring apparatus is provided for each optimal measurement time determined from the limitation of manufacturing capacity, or for each raw material to be handled. That is, a large number of measuring apparatuses are installed.

Recently, one of the present applicants has developed and filed a patent application on the following technique in order to provide a liquid and powder measuring method in which the above-described difficulties are eliminated. The measurement is carried out with high accuracy being free from the variation of flow speed due to disturbances and the variations of liquid physical characteristics (such as viscosity) and of powder physical characteristics (such as fluidity). A wide range of measurement is established and a short time measurement is realized independent from the measurement target value.

That is, Japanese Patent Application No. 106412/1987 discloses a closed loop liquid measuring method in which a freely determined measurement target value and a fed back actual measurement value are utilized to change the flow speed. In this methods the flow characteristic of an opening degree control valve for controlling the flow rate of a liquid and a measurement target value are utilized for fuzzy inference to determine an initial valve opening degree prior to the measurement. The fuzzy control of the valve is carried out according to actual measurement values obtained successively to change the valve opening degree.

Furthermore, Japanese Patent Application No. 106413/1987 discloses a closed loop measurement control method in which a measurement target value and fed back actual measurement value are utilized to vary the flow speed. The difference between a measurement target value and an actual measurement value output by a detector adapted to measure a material to be measured and the variation (with time) of the difference are utilized to apply an output to operating means which varies the flow speed by fuzzy control, learning control or optimal control, whereby the flow speed is optimized. This application also discloses an apparatus for practicing the method.

In the closed loop liquid and powder measurement control method in which fuzzy control, learning control or optimal control of flow control means is carried out, a fundamental factor which makes the conventional measuring apparatus disadvantageous (i.e., the condition that the flow speed is constant) is changed. That is, the flow speed is changed by closed loop control. Therefore, a wide range of measurements can be achieved in a short time without being affected by the variation of flow speed due to disturbances and independently of the measurement target values.

However, the method depends greatly on the flow control valve used. That is, if the flow control valve is large in size, then measurement of a small amount of liquid finally remaining takes a relatively long time. On the other hand, if the flow control valve is small in size, then it takes a long time to measure all the liquid.

Heretofore, in order to make measurements more accurate, measuring units have been used which are of the type which invariably limit the flow rate of each liquid in the process of metrically mixing and distributing the liquids.

In the prior art type of liquid measured mixing and distributing apparatus, such measuring units must be respectively associated with supply tanks from which liquids to be metrically mixed are supplied to one tank.

In the case of using a volumetric type of measuring unit as shown in FIG. 19 two measuring units must be provided with two loop control functions for predictive flow rate control corresponding to two types of supplied liquids.

A liquid regulating unit and liquid supply method are disclosed in Japanese Patent Unexamined Publications Nos. 56-74715 (1981) and 58-163426 (1983). According to these publications, the flow rates of liquids are measured by a common measuring unit but liquid supply means for limiting the flow rate are controlled by respectively independent control loops.

This is because, contrary to expectation, highly accurate measurements cannot be attained by one and the same control function since the flow rates of liquids vary according to the quantities of liquids in the supply tanks, flow rate characteristics of valves, physical properties of liquids, and the like.

This applies to the case of measuring units of the tank metering type, in which actuators of stop valves incorporated in respective systems must be controlled by respective independent loop control systems.

To attain a highly accurate measurement, a method has been proposed in which valves having different flow rates are arranged in parallel to each other so as to be switched based on predetermined metering deviation. Also in this method, two loop control functions are required.

The expression "two loop control functions" is used herein for the following reason. In the case of using, for example, a distributed control unit, two control units are not always required because measuring can be made within one and the same control unit. It may however be said that one control unit as viewed in terms of hardware is separated into two control units as viewed in terms of the number of inputs and outputs and software.

Further, the conventional liquid measured mixing apparatus and measuring distribution apparatus are independent of each other regardless of the measuring unit and control unit. Further, the measuring precision in the prior art has been very rough because of using a volumetric flow meter, ON/OFF control of valves, and the like.

The conventional liquid measured mixing apparatus and measuring distribution apparatus have the following disadvantages because the metrical control is made on the assumption that the flow rate is substantially constant.

A first problem in the conventional apparatus is the measuring accuracy.

A change of flow velocity caused by disturbance or caused by a change of liquid physical properties brings about a situation that accuracy cannot be secured.

In the case of gravity transport, the flow velocity of an outflow liquid always changes according to the residual quantity of liquid within each supply tank. The flow velocity may exceed a certain conditional limit if the change of the residual quantity is too large, resulting in deterioration in accuracy.

To improve accuracy, the quantity of liquid within each supply tank must be limited within a certain range to keep the quantity of liquid above a predetermined value, resulting in liquid loss to thereby increase running cost.

A second problem with the conventional apparatus is the measurement range since the measuring range is narrow. This is because, immediately after measuring stops, the inflow of liquid cannot stop because of the delay of response of the system. Because the quantity of the liquid inflow is determined by the flow velocity, the allowable inflow quantity is secured by narrowing the measuring range under the condition that the flow velocity is constant. Accordingly, even in the case where two liquids to be measured are quite the same, measuring units each having a proper measuring range are required, resulting in an increase in number of the units.

A third problem with the conventional apparatus is the measuring time. Since the measuring time is affected by the measurement target value. As the target value becomes smaller, the measuring time becomes shorter, while as the target value becomes larger, the measuring time becomes longer. Accordingly, measuring units suited to the manufacturing cycle are required to correspond to the measured value, resulting in an increase in the number of the units if there are different target values.

Because a large number of independently controlled measuring units are provided for respective supply tanks and distribution tanks and for respective optimum measuring times due to the limitation of manufacturing capacity for the aforementioned reason, the system of the conventional liquid measured mixing and distributing apparatus is complicated. In short, a large number of measuring units are required corresponding to the number of distribution tanks The present invention has been attained in view of such circumstances, and an object of the present invention is to provide a liquid measured mixing and distributing apparatus in which the distribution system for liquids is constructed as a consecutive system by use of a measuring control unit by which highly accurate metering without influence of a change in flow velocity caused by disturbance or cause by a change in liquid physical properties and short-time metering to secure a wide metering range regardless of the metering set values. Such a system can be attained on the basis of a fuzzy-control liquid measured mixing apparatus described in Japanese Patent Application No. 62 113430 (1987) previously filed by one of the applicants of this application. Particularly a measured mixing apparatus and a measuring distribution apparatus are synthesized as one apparatus to thus attain an increase of manufacturing capacity and a reduction of raw-material loss to produce the following economic effects:

(1) A reduction of initial cost due to the reduction of the number of units;

(2) A reduction of the frequency of maintenance due to the reduction of the number of units;

(3) A reduction of breakdowns due to an improved reliability due to the reduction in the number of units; and (4) A reduction of running cost due to the reduction of raw-material loss, and the like.

In measuring devices applicable to a conventional liquid/powder measuring-mixing-dispensing system, the flow velocity has been set as a constant and therefore accurate measurement has hardly been attained thereby. In other words, the measuring device has been designed to measure the flow velocity restricted to what corresponds to a set measuring flow instead.

In the liquid/powder measuring-mixing-dispensing system of a conventional type designed to mix the liquids or powders supplied from a plurality of supply containers to one mixing container and to dispense the mixed liquid to dispensing containers, each of the supply containers and dispensing containers is equipped with a measuring device attached thereto.

When volumetric metering devices are employed in a liquid/powder measuring-mixing system, for instance, two measuring devices are, as shown in FIG. 20 used respectively for two supply containers of a liquid A and a powder B. Consequently, a control unit will be required to have a double loop function in order to control the quantity of a liquid or powder fluid preliminarily flowing into a mixing container.

In other words, because the speed of the flowing liquid or powder varies with the liquid or powder quantity in the supply container of the liquid A or the powder B, the characteristics of the flow rate regulator and the physical properties of the liquid or powder, no accurate measurement can be expected from a single loop control function.

This is also the case with a tank metering method in which a shut-off valve of an actuator attached to each system has to be controlled by an independently looped control system.

There is a method of installing parallel flow rate regulators with different flow velocities, the regulators being switched with a predetermined measuring variation to implement accurate measurements. Even in this case, however, the double loop control function is required.

The reason for the use of an expression of the double loop control function above is that, though the data can be processed in one control unit, provided a switch unit or the like is employed, for instance, the necessity of more than one physical control unit can be avoided. Notwithstanding, the system still relies on two effective control units in view of the number of input/output terminals and software.

In the batch production process in which a number of liquids or powders are used, the physical properties of these liquids or powders are different and this makes it often impossible to cumulatively measure then in one and the same container. Accordingly, a production system shown in FIG. 21 becomes justified. This production system is arranged so that a plurality of mixing containers (measuring hoppers and measuring-metering tanks) are installed. Mixable liquids and powders are fed into and measured in the same mixing container (measuring tank or hopper as a first mixture), whereas liquids and powders unmixable with the first mixture are accommodated in a separate container hopper or tank). Another mixing container (control tank) for controlling the reaction and preparation is required on the downstream side and consequently the system tends to become complicated.

In a production system where a mixing container (control tank) for controlling the reaction and preparation is fixed, a high initial investment is required in facilities corresponding to the contents of the products when many types are produced. Furthermore, to implement accurate measuring, there are required a number of measuring tanks and control tanks with piping, measuring devices, control units and associated valves which are attached thereto. In this case, the facilities are usable for some types of products but unusable for others and therefore the system becomes highly wasteful of facilities and also causes the initial facility cost to increase. The introduction of a multipurpose production system is being called for but such a production system tends to become further complicated, because not only the piping system but also the attachment devices will have to be altered if it is of a fixed type (e.g., Japanese Patent Application (OPI) Nos. 74715/81, 155412/81, 72015/82 and 81559/79).

As a result, there has recently been proposed a moving batch production system in which a mixing container (metering tanks, control tanks) is movable. When the conventional metering devices are applied to that system, however, the measuring time varies with the size of a measurement target value and, if the target value is large, it takes much time for the measurement and imposes a restriction on the time required to convey the containers in the moving production system. For this reason, the required number of measuring devices is installed in the conventional production system so as not to restrict the time of conveyance. However, this arrangement is likely to conflict with the intended advantages of the moving production system. Further, the length of stay at a station tends to become prolonged in such a system. A large number of measuring devices are required because of the range of measurement target values, restrictions on the measuring time, conditions of measuring precision, etc. Consequently, the time required for the operation of the coupling pipes increases.

As photosensitive materials are dealt with in the process of producing photographic materials, light must be shielded out and the increased number of joints results in the complication of the system, whereas the performance of the products is readily affected by a change of the conveyance cycle.

Moreover, the measuring-dispenser of the mixed liquid does not share the measurement control system with the measuring mixer. Besides, the measuring device attached to each dispensing container is employed to implement a simple open loop measuring control method by means of a level gauge or time metering.

As measurement control presupposing a constant supply flow velocity is performed in the conventional liquid/powder measuring-mixing-dispensing system, the following drawbacks are similar to those of the liquid measuring-mixing system.

(1) Measurement precision: Measurement precision is not always ensured because of the fluctuation of flow velocity resulting from disturbance and changes in the physical properties of the liquids or powders.

More specifically, the selection of a conveyor depends on the physical properties of the powder, e.g., a damper is used to convey granular powder because it offers excellent fluidity, whereas a screw feeder is used to convey powder whose fluidity is poor. However, the flow of the powder cannot be precisely determined but may be changed by the bulkiness or profile of the powder, and disturbances such as vibration. When liquids or powders are gravity-conveyed, the velocity of the flowing-out liquids or powders varies with the residual amounts of the liquids or powders in the supply container, for instance. However, if the residual amount greatly varies, the measuring accuracy will deteriorate as the flow velocity exceeds the set range of conditions.

This means that the quantity of the liquids or powders in the supply container has to be limited to within a certain range so that more than a fixed quantity of the liquids or powders is secured in the container. Otherwise the lose resulting from the residual liquids or powders in the supply container would increase the running cost.

(2) Measuring range is narrow.

The reason for this is that there remains an inflow due to delay in the response of the system to the suspension of measuring. In view of this fact, the allowable inflow is ensured by narrowing the measuring range on the condition that the flow velocity is constant because the inflow is determined by the supply flow velocity. Measuring devices respectively having adequate measuring ranges are required when the set measurement target values greatly differ from each other even if the same liquid or powder is to be measured. Consequently, the number of measuring devices to be installed increases.

(3) Measuring time: The measuring time is influenced by the set measurement target value. The greater the set target value, the shorter the measuring time becomes, and vice versa. Accordingly, the measuring device has to offer proper measurement times in terms of the production cycle in proportion to the set target value. The number of measuring devices increases also in this case.

For the above-described reasons, a number of individually controlled measuring devices are provided for the supply containers respectively at optimum measurement intervals under the restrictions of the production capacity in the conventional liquid/powder measuring-mixing-dispensing system. Accordingly, the system has become complicated in construction, whereas a large number of measuring devices are required to be incorporated in the production facilities. As a dispenser, the system is incapable of high measuring precision, wasteful of liquid and also needs prolonged time for the measurement.

SUMMARY OF THE INVENTION

Accordingly, an object of this invention is to provide a liquid and powder measuring method and apparatus in which a novel flow control valve having excellent performance is used so that the measurement be achieved with high accuracy in short time, and a wide range of measurements can be accomplished being free from the variation of flow speed due to disturbance. Furthermore, the apparatus is of simple design.

The foregoing object of the invention has been achieved by the provision of a closed loop liquid measuring method in which the flow characteristic of a flow control valve for adjusting the flow rate of a liquid and a freely determined measurement target value are utilized for performing fuzzy inference, learning control or optimal control to determine an initial valve opening degree prior to the measurement. Fuzzy control of the flow control valve is carried out according to actual measurement values which are detected successively. According to the invention, the flow control valve is a motor-controlled flow control valve which is small and linear in the rate of change of flow rate with valve stroke and large in the maximum flow rate.

In the fuzzy inference of the invention, the data directly observed or calculated and the data directly observed or calculated and the data subjected to low-pass filtering are used for control processing operation with the dynamic characteristic of a measuring detector taken into account.

In the control method, fuzzy control is employed, and with respect to the membership function of the fuzzy inference the axis for physical data is expressed semi-logarithmically.

The initial valve opening degree is determined by the fuzzy inference which is made according to the flow characteristic of the valve and the measuring set value. Then, the amount of operation is calculated by the fuzzy control method and outputted to the operating terminal.

In the method of the invention, the fuzzy control, learning control or optimal control is non-linear in the modeling of the measuring system, and therefore it cannot be realized by a control system such as a conventional simple PID control system.

Therefore, according to the control method used in the invention, the difference between a measurement target value and an actual measurement value and the variation with time of the difference are utilized to calculate an optimal amount of operation. The control may be either fuzzy control, learning control or optimal control. Thereby the flow speed is continuously or intermittently changed best for the measurement control.

In the invention, the detector observes the variation with time of the measurement value. It may be a load cell or a differential pressure transmitter which can observe measurement values. In the invention, the range of measurement depends on the static accuracy of the detector.

In the invention, the measuring tanks for receiving liquid and powder are such that the tanks receive liquid and powder, respectively, or each tank receives both liquid and powder, as the case may be. For simplification of the equipment, a method of using one measuring tank to receive both liquid and powder may be employed, if it does not adversely affect the product.

The above-described detector is fixedly or detachably coupled to the measuring tank.

In the invention, the motor-controlled flow control valve which is small and linear in the rate of change of flow rate with valve stroke and large in the maximum flow rate is designed as follows. An electric motor is used to operate the valve. The rotation of the motor is converted into a linear motion by means of a feed screw and a coupling board. The coupling board is connected to the valve shaft, so that the coupling board and the valve shaft are moved as one unit. The valve has a casing along the central axis of which the valve shaft extends. The casing is made up of an upper end portion, namely, an inlet-side casing, and a lower end portion, namely, an outlet-side casing merging with the inlet-side casing. A cylindrical or conical valve head is formed on a working face shaped as a circular truncated cone, which is tapered towards the outlet of the valve, in such a manner that the valve head is positioned inside the outlet-side casing. The valve head is so shaped that, with respect to the valve opening degree defined by the surface of the valve head and the valve seat, the rate of change of flow rate with valve stroke is small and linear, and the valve stroke to fully open the valve is provided in the inlet-side casing.

Although the foregoing object of the present invention was generally solved by a previous invention proposed by the Applicant of this application in Japanese Patent Application No. 62-110857. The present invention which can provide further effects has been attained as a result of research thereafter.

That is, the liquid measured mixing apparatus cumulatively measures and mixes a plurality of liquids to prepare a mixture liquid by closed-loop liquid metering method while a velocity of flow is allowed to change. The apparatus according to the present invention comprises a plurality of supply tanks respectively filled with liquids as raw materials, a liquid receiving tank for mixing the liquids received from the supply tanks, a plurality of flow control valves respectively associated with the supply tanks a detector arranged to the liquid receiving tank to metering the liquid, a measurement control unit for performing fuzzy control on the basis of actual values measured by the detector and arbitrarily set target values so as to calculate the opening degrees of the respective flow control valves, and a switching unit for switching the output of the measurement control unit to a predetermined one of the flow control valves. An electric motor is used as motive power for adjusting at least one of the flow control valves. The rotation of the electric motor is converted into a linear motion by means of a feed screw and a connection plate. The at least one flow control valve has a valve shaft attached to the coupling plate so that the valve shaft moves vertically according to the vertical motion of the coupling plate. An inlet-side valve box is arranged around the valve shaft. An outlet-side valve box is connected to the inlet-side valve box. A valve face is in the form of a tapered circular truncated cone. A cylindrical or conical valve head is mounted on the front of the valve face and installed within the outlet-side valve box. A valve seat is arranged to form a valve opening area between the valve seat and a surface of the valve head. The shape of the valve head is determined so that the rate of change in flow velocity is small and linear relative to a valve lift which is kept within said inlet-side valve box till the opening of said valve seat is completely opened.

The foregoing object of the present invention is further attained by a liquid measured mixing and distribution apparatus in which flow velocity can be changed from moment to moment by measurement control units through closed-loop control so that the measurement control units can be reduced in number. The liquid measuring mixing and distribution apparatus of the present invention comprises the following constituent parts.

(1) Supply tanks: Tanks for storing liquids to be measured. The capacity of each tank is built on a scale suited to manufacturing. In the present invention, there is no limitation as to the residual quantity of liquid remaining in each tank. Theoretically, the residual quantity of each tank can be measured down to zero. The measurement of the residual quantity is not affected by the physical properties (such as viscosity and the like) of liquid, so that the residual quantity can be measured down to zero as long as the liquid has a physical property allowing it to flow out.

(2) A mixer tank: A tank having capacity suited to the manufacturing scale. The tank is provided with a stirrer for mixing. The tank may have a jacket structure to make heat insulation possible through the circulation of warm water. It is, however, necessary to stozzzzzzzz the circulation of warm water when the weight of liquid is measured with a weight gauge. Further, the measurement control unit must have such a function that the weight can be automatically reset to apparent zero as a measurement start point whenever weighing is started.

(3) Distribution tanks: A suitable number of tanks to which a mixed liquid is distributed are arranged corresponding to the manufacturing system.

(4) Flow-control valves: A suitable number of flow-control valves each for varying the flow velocity by the change of the opening degree thereof are provided corresponding to the number of supply tanks and the number of distribution tanks. Each valve has such a structure that the valve is closed at the opening degree in the vicinity of 0%, while the valve is opened to pass liquid at the opening degree in the vicinity of or over about 10%. When the opening degree is over 10%, the valve has a variable flow-rate characteristic other than a quick-open characteristic. The valve may be actuated by a driving source, such as an AC servomotor or the like.

(5) A detector: The detector is a device arranged on the mixer tank for the double purpose of measuring the quantities of liquids received by the mixer tank and measuring the quantities of liquids distributed from the mixer tank. In the case where liquids can be mixed, the liquids can be cumulatively measured through one and the same liquid-receiving tank.

(6) A measurement control unit: This unit is an accurate measurement control unit for performing closed-loop control to change the flow velocity. The measurement and distribution of respective liquids are made by one and the same measurement control unit. The opening degree of each opening-regulated valve is made variable by a control system according to fuzzy inference. That is, the initial opening degree of the valve is determined by the flow-rate characteristic target value of the valve. After the initial opening, the opening degree of the valve is controlled according to fuzzy inference based on the actual value and the target value. When the control unit performs a function of additive metering (a function of measuring liquids while receiving them), the liquids from the supply tanks can be measured. When the control unit provides a function of subtractive metering (a function of measuring liquids while transporting them), the liquid can be distributed to the downstream tanks in the proportion of suitable quantities. A plurality of liquids can be measured by use of one and the same tank and one and the same measuring unit to thereby reduce the number of measuring units in number.

(7) A switching unit: A unit for switching the output of the measurement control unit to suitable one or ones of the opening-regulated valves in the liquid supply system and the mixed liquid distribution system.

While the basic constituent parts of the present invention have been described the subject of the present invention resides in that a closed-loop measurement control unit is used to vary flow velocity for performing control based on fuzzy inference.

An object of the present invention made in view of the aforesaid disadvantages of conventional devices awaiting remedy is to provide a liquid/powder measuring-mixing-dispensing system economically having the effect of reducing:

(1) the initial cost by decreasing the number of measuring devices;

(2) maintenance delays by decreasing the number of devices; and (3) running cost by reducing the raw material loss.

The above objects are achieved by making use of a liquid measuring-mixing apparatus under fuzzy control as applied by the present applicants in Japanese Patent Application No. 115894/87. This method provides precision measurements unaffected by flow velocity fluctuations due to disturbances being measured. It secures a wide range of measurements, and implements short time measurements unaffected by the size of the set measurement target value. It further forms the liquid/powder measuring mixing-dispensing system into a consistent one in order to simplify the production facilities and to augment the production capacity while reducing the raw material loss.

The foregoing object of the present invention is accomplished by providing a liquid/powder measuring-mixing-dispensing system for cumulatively measuring liquids and powders supplied from each of a plurality of supply containers. The liquids and powders received therefrom are mixed in a mixing container, and a mixed liquid is dispensed from the mixing container to a plurality of dispensing containers. The system comprises flow rate regulators attached to supply piping extending from the supply containers and dispensing piping from the dispensing containers. A measuring device measures the liquids or powders being supplied from the supply containers and the mixed liquid being supplied from the mixing container to the dispensing containers. The measuring device is installed on the mixing container. A measurement control unit measures a flow rate in each flow rate regulator under closed loop control by causing the flow rate to change with the fuzzy logical inference in proportion to each measured supply value and each measured dispensing value. A moving unit moves the mixing container.

DETAILED DESCRIPTION OF THE PREFERRED EMBODIMENTS

A first embodiment of this invention will be described with reference to FIGS. 1-7.

Figure 1:
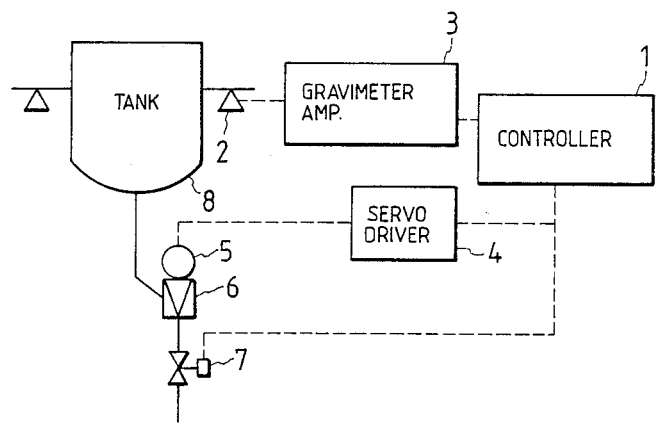
FIG. 1 is an explanatory diagram for a description of a liquid measuring apparatus in one embodiment of this invention.

FIG. 1 shows a liquid measuring apparatus employed in this embodiment of the invention. It is operated according to a subtraction type measurement method of observing the quantity of liquid flowing out a measuring tank.

FIG. 1 illustrates a measurement control device 1. A load cell 2 measures the weight of raw material remaining in a measuring tank 8. A gravimeter amplifier 3 amplifies the signal from the load cell 2. A servo driver 4 is controlled by the measurement control device 1. A servomotor 5 is driven by the servo driver 4 to operate a flow control valve 6 (to be described later). The flow control valve 6 adjusts the quantity of liquid flowing out of the measuring tank 8. A stop valve 7 controlled by the measurement control device 1 stops the outflow of liquid. The flow characteristic of the flow control valve 6 is linear as shown in trace (c) of FIG. 3(a).

Now, a liquid measuring method according to the invention will be described.

Figure 2:
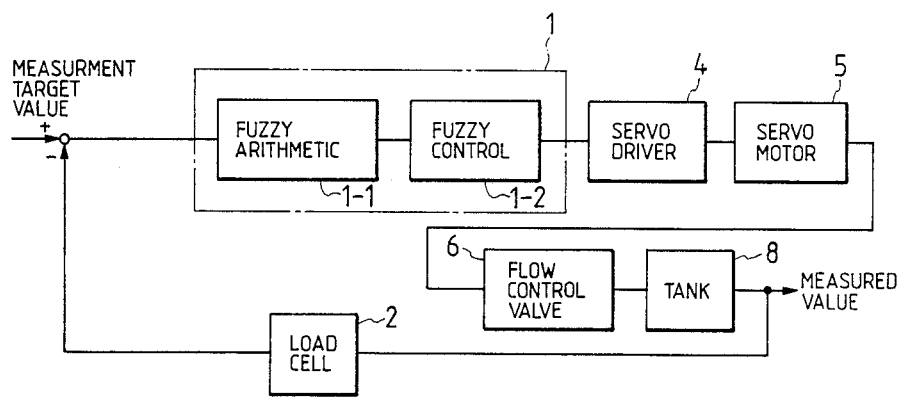
FIG. 2 is a block diagram for a description of a control process in the apparatus shown in FIG. 1.

FIG. 2 shows a control process concerning the liquid measuring method of the invention.

When a measurement target value is given to the measurement control device 1, the control device calculates an initial valve opening degree from the valve flow characteristic shown in FIG. 3 by fuzzy inference. Fuzzy inference both for the initial setting and during the successive measurement cycles will be described at the end of this description. Upon the start of the measurement, the measurement control device 1 applies an initial valve opening setting through the servo driver 4 to the servomotor 5 of the flow control valve 6, as a result of which the liquid flows out of the measuring tank 8 and the actual weight value of the load cell 2 changes. On the other hand, an actual weight value outputted by the gravimeter amplifier 3 is measured by the measurement control device 1 with a predetermined control period. A fuzzy arithmetic section 1—1 in the measurement control device 1 calculates a difference between a measurement target value from the load cells and an actual weight value and also calculates an amount of change (with time) of the difference. It then calculates an observation amount obtained by subjecting these data to low-pass filtering, thereby to perform an inferential operation for a valve opening degree according to a predetermined fuzzy rule. In this case, a membership function for fuzzy inference is as shown FIG. 4 in which the axis corresponding the above-described amounts of difference between the measurement target value and the actual weight value and the amount of change (with time) thereof, namely, physical data, is divided such that the intervals for small physical data are made fine. For instance, the axis is graduated semi-logarithmically. This is to improve the measurement accuracy and to reduce the measuring time. If the amount of difference is large, a tight control characteristic is not always necessary, but when the amount of difference is small, it is necessary to improve the control accuracy. This is applicable to the primary filtering function. In the case where the amount of difference is small, the amount of difference of the primary filter is utilized to release the dynamics of the measuring detector thereby to improve the measurement accuracy.

Figure 5:
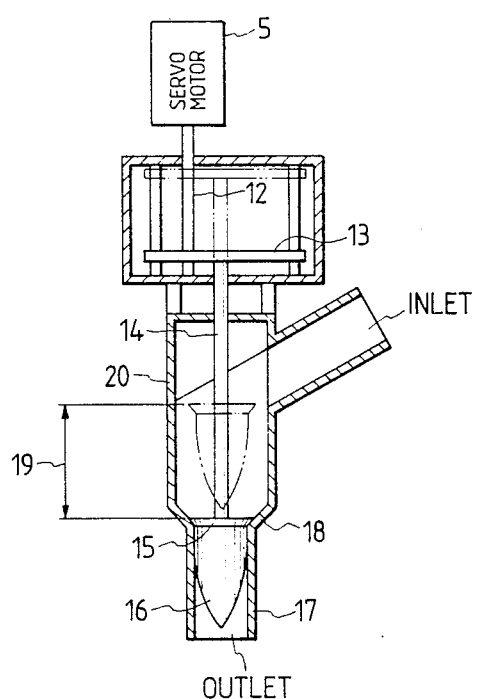
FIG. 5 is a sectional side view of a flow control valve in the invention.

FIG. 5 is a sectional side view showing one example of the flow control valve employed in the invention.

As the servomotor 5 rotates, a feed screw 12 is rotated to move a coupling board 13. A valve shaft 14 is secured to the coupling board 13. Therefore, the valve shaft 14 and the coupling board 13 are moved vertically as one unit.

The term "servomotor" as used herein is not intended to be limiting but may cover all electric motors such as an AC servomotor. DC servomotor, and stepping motor (or pulse motor) which can control mechanical positions, direction, angles and speeds (rpm).

A cylindrical or conical valve head 16 is formed on a circular-truncated-cone-shaped valve face 15, which is tapered towards the outlet of the flow control valve, in such a manner that it is located inside a lower end portion 17 of a valve casing (hereinafter referred to as "an outlet-side casing 17"). The valve head 16 is so shaped that the rate of change of flow rate with respect to a valve stroke H defined by the surface of the valve head 16 and the valve seat 18 is small and linear as indicated by the characteristic curve (c) in FIG. 3(a) or 3(c) or curve (a) of FIG. 3(b).

The valve stroke 19 to fully open the valve is accommodated in an upper end portion 20 of the valve casing (hereinafter referred to as "an inlet-side casing 20". The servomotor 5 is used to move the valve head 16.

Although the combination of the motor and the feed screw is described herein as a method of moving the valve, other methods may be used as long as an electrical signal is converted to a linear movement. For example, an air servo cylinder may be used to move the coupling board 13 directly.

Figure 6A:
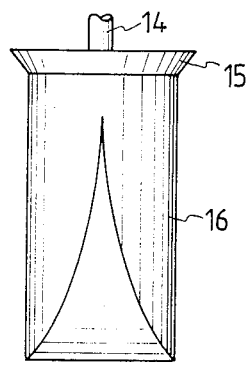
FIGS. 6(a) and 6(b) are side views showing examples of the valve head of the flow control valve in FIG. 5.
Figure 6B:
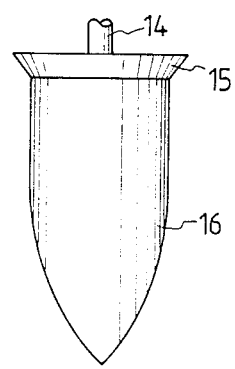
Figure 7:
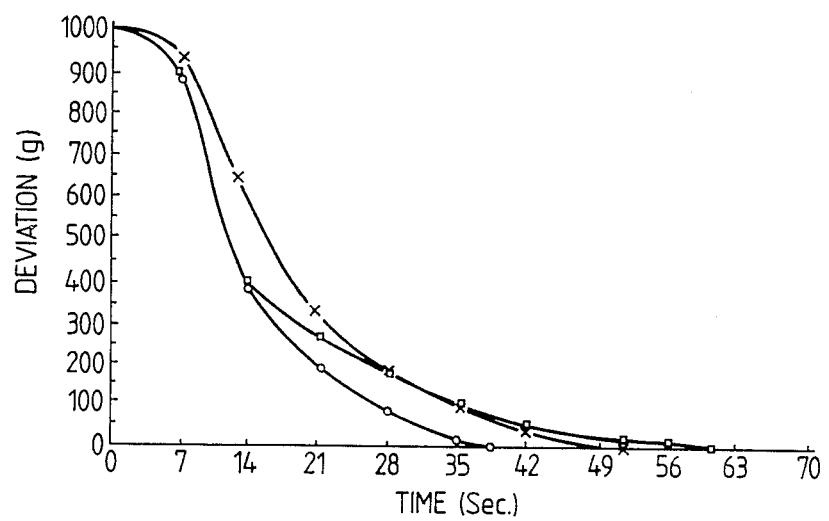
FIG. 7 is a graph for comparison of the results of metering in which various types of flow control valves are used with the embodiment of the invention of FIG. 1.

The valve head 16 is conical as shown in FIG. 6(a) or cylindrical as shown in FIG. 6(b). That is, it is so shaped that the rate of change of flow rate with respect to valve stroke is small and linear as shown in FIG. 3.

Each of the valve heads 16 shown in FIGS. 6(a) and 6(b) is so formed that the relation of valve opening degree difference (h) with valve opening area (a) is linear. Such a design rule may be theoretically realized in the valve heads 16 of both FIGS. 6(a) and 6(b). However, they suffer practical difficulties.

Therefore, the valve heads shown in FIGS. 6(a) and 6(b) may be formed with an approximate curve, or, in the case where the change in area a per change in valve opening h can be held small, they may be formed with one or more approximated straight lines.

When, in this case, the valve is substantially fully opened, the linearity is liable to be lost. Therefore, in this case the range of the linearity may be enlarged slightly more than the theoretically necessary range by increasing the length of the valve head and the diameter of the valve casing to thereby secure the necessary range of linearity for the flow velocity. Also, the valve casing may be made larger in diameter so that the valve is somewhat large in dimensional margin so that the linearity can be obtained over a larger range than required.

As was described above, the cylindrical or conical valve head is formed on the circular-truncated-cone-shaped working face, which is tapered towards the outlet of the valve, in such a manner that the valve head is located inside the outlet-side casing. The valve head is so shaped that, with respect to the valve opening degree defined by the surface of the valve head and the valve seat, the rate of change of flow rate with valve stroke is small and linear. Therefore, with the flow control valve of the invention, the flow rate can be finely controlled over the entire range of flow rates.

Furthermore, the valve stroke to fully open the valve is provided in the inlet-side casing. Therefore, when the fluid flows from the inlet of the valve to the outlet, the resistance is low, and the range of flow rates handled by the valve can be increased, for instance, to 1:50.

Feedback control can be employed for the electric motor used to operate the valve, and therefore the control resolution and response characteristic can be improved as much.

In the present invention, any suitable material can be used for the valve and valve casing. Preferably, the material and particularly the hardness of the valve casing (including the inlet-side valve casing, the outlet-side valve casing and the valve seat) may be different from that of the valve (including the valve shaft and the valve head) in order to increase the manufacturing accuracy and for the purpose of preventing the valve casing and the valve from biting each other because of impurities deposited thereon. Preferably, the materials are suitably selected from the following combinations: iron-stainless steel, stainless steel-stainless steel (hard chrome plated), ceramic-stainless steel, and the like.

The terminology "electric motor" used in this specification means such a motor in which the mechanical position, angle, revolution number and the like can be controlled corresponding to an input signal, for example and specifically, an AC servomotor, a DC servomotor, a stepping motor (pulse motor), and the like.

In a closed loop liquid measuring method in which fuzzy control is carried out, a motor-controlled flow control valve which is small and linear in the rate of change of flow rate with valve stroke and large in the maximum flow rate is employed according to the invention.

Therefore, in the initial measuring period, the flow rate can be high as in the case where the valve is fully opened and the measuring speed can be correspondingly increased. Even when the valve opening is decreased as the desired measurement value is approached, the valve stroke can be greatly adjusted to control the flow rate with high accuracy. Therefore, in the final measuring period as well, the measuring speed is increased, the flow rate can be controlled with high accuracy. Thus, when compared with the fuzzy control with the conventional flow control valve, the fuzzy control with the flow control valve of the invention can control the flow rate quickly from the initial measuring period to the final measuring period with high measurement accuracy.

SPECIFIC EXAMPLE 1

Figure 3A:
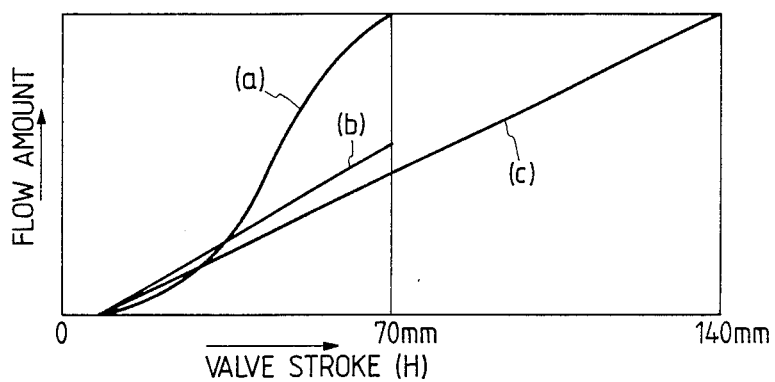
FIGS. 3(a) and 3(c) are graphical representations showing the characteristic curves of flow control valves.
Figure 3B:
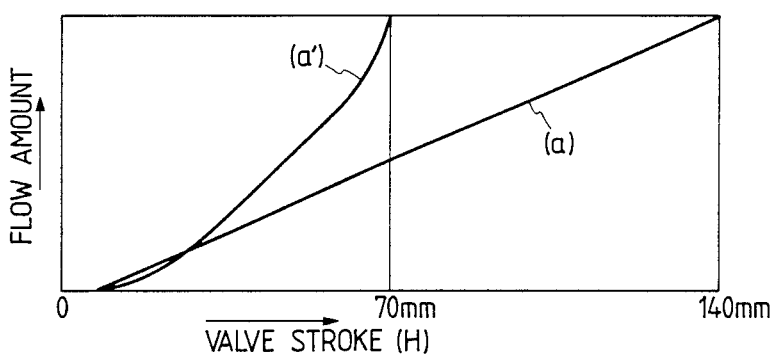
FIG. 3(b) is a graphical representation indicating the characteristic curves of the flow control valve (a) of the invention and of a conventional flow control valve (a').

Three kinds of high-flow-rate flow control valves whose characteristics are as indicated by curves (a), (b) and (c) in FIG. 3(a), respectively, were used to measure 1000 g of liquid. More specifically the first (a) of the three flow control valves had a characteristic substantially similar to that of a conventional equal percent type flow control valve, the second (b) was a conventional linear type flow control valve, and the third (c) was a linear type flow control valve concerning the invention.

In the measurements with the three flow control valves, the fuzzy control was employed. With the flow control valve (a), the measurement was accomplished in sixty (60) seconds as indicated by open rectangles in FIG. 7. With the flow control valve (b), the measurement was achieved in fifty-one (51) seconds as indicated by (X) in FIG. 7. With the flow control valve (c), the measurement was accomplished in forty (40) seconds as indicated by (O) in FIG. 7. With any one of the flow control valves, the measurement accuracy was ±1.0 g or less. However, it was noted that the flow control valve (c) was superior in measurement accuracy to the other two flow control valves (a) and (b). It is true that the fuzzy control is an excellent control method. However, it is apparent from the above-described results of measurement that the measuring time depends greatly on the flow control valve employed.

As is apparent from the above description, the effect of the flow control valve is added to that of the fuzzy control, in the invention.

That is, in addition to (1) the highly accurate measurement which is free from disturbance, (2) the wide range measurement having a wide range of measurement target values, and (3) the short time measurement which does not depend on the measurement target value (4) the quick measurement time and the excellent measurement accuracy are obtained by the selection of the flow control valve.

Accordingly, the measurement can be achieved in a much shorter time in the liquid measuring method of the invention than in the fuzzy control method using the conventional flow control valve. Thus, the employment of the liquid measuring method of the invention will greatly improve the efficiency of measuring work, and it will contribute greatly to the rationalization of industry such as the streamlining of measuring equipment.

Another and second preferred embodiment of this invention will be described with reference to the accompanying drawings.

Figure 8:
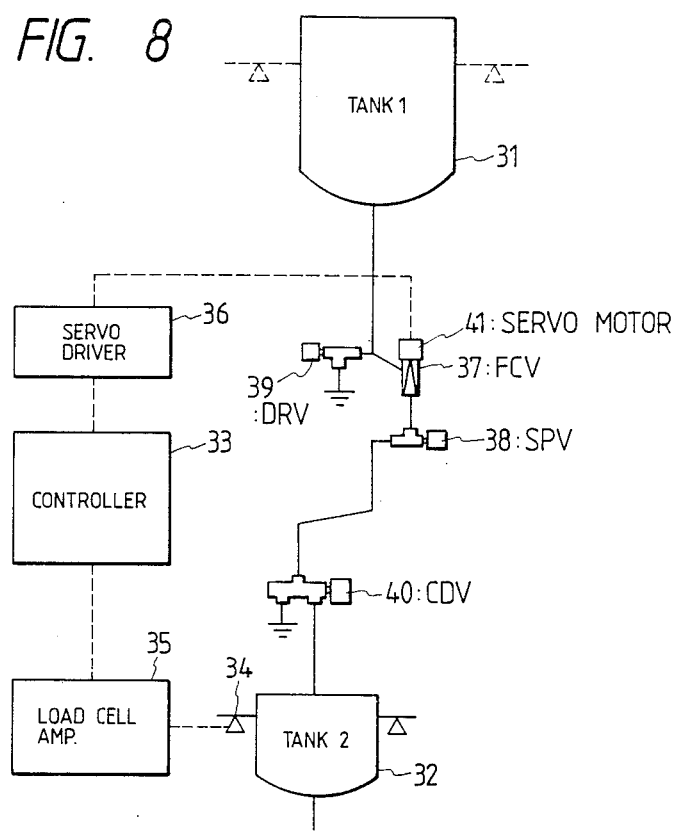
FIG. 8 is a flow sheet showing a second embodiment of a liquid measuring system which can be a liquid and powder measurement control method according to this invention.

FIG. 8 is an explanatory diagram showing a liquid measuring apparatus which is a key point of the invention, and is provided with a powder measuring apparatus (not shown).

The liquid measuring apparatus will be described with respect to the case where, as shown in FIG. 8, material filled in an upstream tank 31 is conveyed to a downstream tank 32, which is a measuring tank. The material is weighed with a load cell 34 coupled to the downstream tank 32.

An FCV (flow control valve) 37 for varying the flow speed, a DRV (drain valve) 39, an SPV (stop valve) 38, and a CDV (cleaning drainage valve) 40 are provided in the pipe line between the upstream and downstream tanks 31 and 32. The downstream tank 32 has attached thereto the load cell 34 which is a detector for detecting the weight of a material to be measured. The load cell 34 is connected through a load cell amplifier 35 to a measurement control device 33. The controller is connected to operating means, namely, a servo driver 36 and the FCV (flow control valve) 37.

The liquid measuring apparatus thus organized performs the measurement of the material to be measured as follows. The measurement is started when a measurement target value is given to the measurement control device 33 at the same time that the DRV (drain valve) 39 and the CDV (cleaning drainage valve) 40 are switched to stop draining the measurement line. When the measurement control device 33 becomes ready for the measurement, the SPV (stop valve) 38 is opened, and the measurement control device 33 applies a position instruction to the servo drive 36 so that the FCV (flow control valve) 37 is set to a predetermined opening. That is, a servomotor 41 is driven to set the valve head of the FCV 37 at the specified position, thereby to adjust the opening degree. Thus, the raw material, namely, liquid is allowed to flow from the upstream tank 31 to the downstream tank 32.

The load cell of the downstream tank 32 detects the weight of the raw material thus moved into the tank, and feeds it back to the measurement control device 33 through the load cell amplifier 35.

The measurement control device 33 calculates the difference between the actual weight value and the target value, and the amount of change (with time) of the difference. It calculates a valve opening degree instruction (or position instruction) which provides a suitable flow speed according to fuzzy control, learning control or optimal control, so as to apply a new valve opening degree instruction (or position instruction) to the FCV 37 to thereby change the flow speed.

Figure 9:
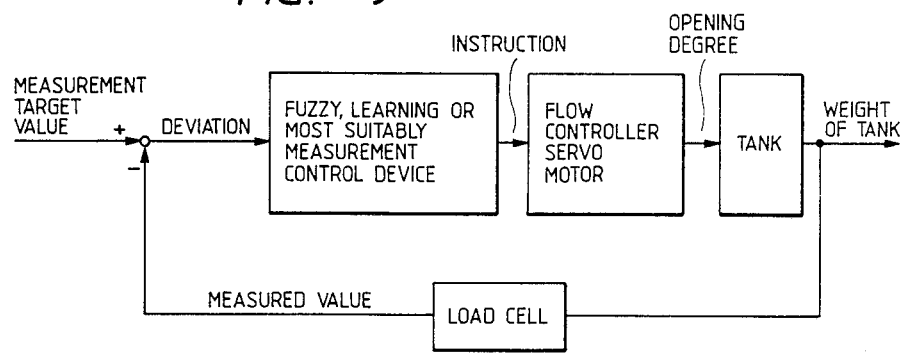
FIG. 9 is a block diagram showing the control method of the invention used with the apparatus of FIG. 8.

Thus, the opening degree of the FCV 37 is controlled in a closed loop (FIG. 9) according to the data detected by the load cell 34 so that it is approximated continuously or at predetermined time intervals. When the measurement difference becomes small, the opening degree of the FCV 7 is decreased, and accordingly the flow degree of the FCV 7 is decreased, and accordingly the flow speed is also decreased. Therefore, after suspension of the measurement, the amount of residual inflow is small, and the measurement accuracy is improved since it is not affected by the variation of flow speed which may be caused by disturbance such as head differences in the amount of liquid remaining in the upstream tank 31.

Although the method of controlling the opening degree of a valve is described herein as a method of controlling a flow amount, a method of controlling a pressure, in which a pressurizing means is provided at a supply tank side, may be used.

In the measurement control device 33 of the invention, the control of the FCV 37 depends on a measurement target value set for the processing system at hand as long as it remains within the range of measurement. Therefore, one and the same measuring apparatus can be used for a variety of measuring target values. That is, the range of measurement is increased as much as long as the static accuracy of the detector is observed. Furthermore, during the measurement, the operating pattern of the FCV 37 is changed. Therefore, for a variety of measurement target values, the measurements can be achieved substantially in one and the same short period of time.

The liquid flow control valve in the invention is a motor-controlled flow control valve (FCV) which is small and linear in the rate of change of flow rate with valve stroke and large in the maximum flow rate. One example of the flow control valve (FCV) has been described with reference to FIGS. 3, 5, 6(a) and 6(b).

In the closed loop liquid and powder measurement control method of the present invention, the difference between a freely determined measurement target value and an actual measurement value are outputted by a detector adapted to measure a material to be measured.

The variations (with time) of the difference are utilized for fuzzy control, learning control or optimal control of the liquid or powder flow control means. Thereby, the motor-controlled flow control valve which is small and linear in the rate of change of flow rate with valve stroke and large in the maximum flow rate is employed as the liquid flow control means. In the measurement control method, and in the apparatus for practicing the method, during the initial measurement period the valve opening is set to be open wide to perform the measurement with high flow rate. Then the valve is closed gradually with the lapse of time so that the flow rate is controlled with high precision. Therefore, the range of measurement is considerably wide, and the measurement time can be reduced.

SPECIFIC EXAMPLE 2

Figure 10:
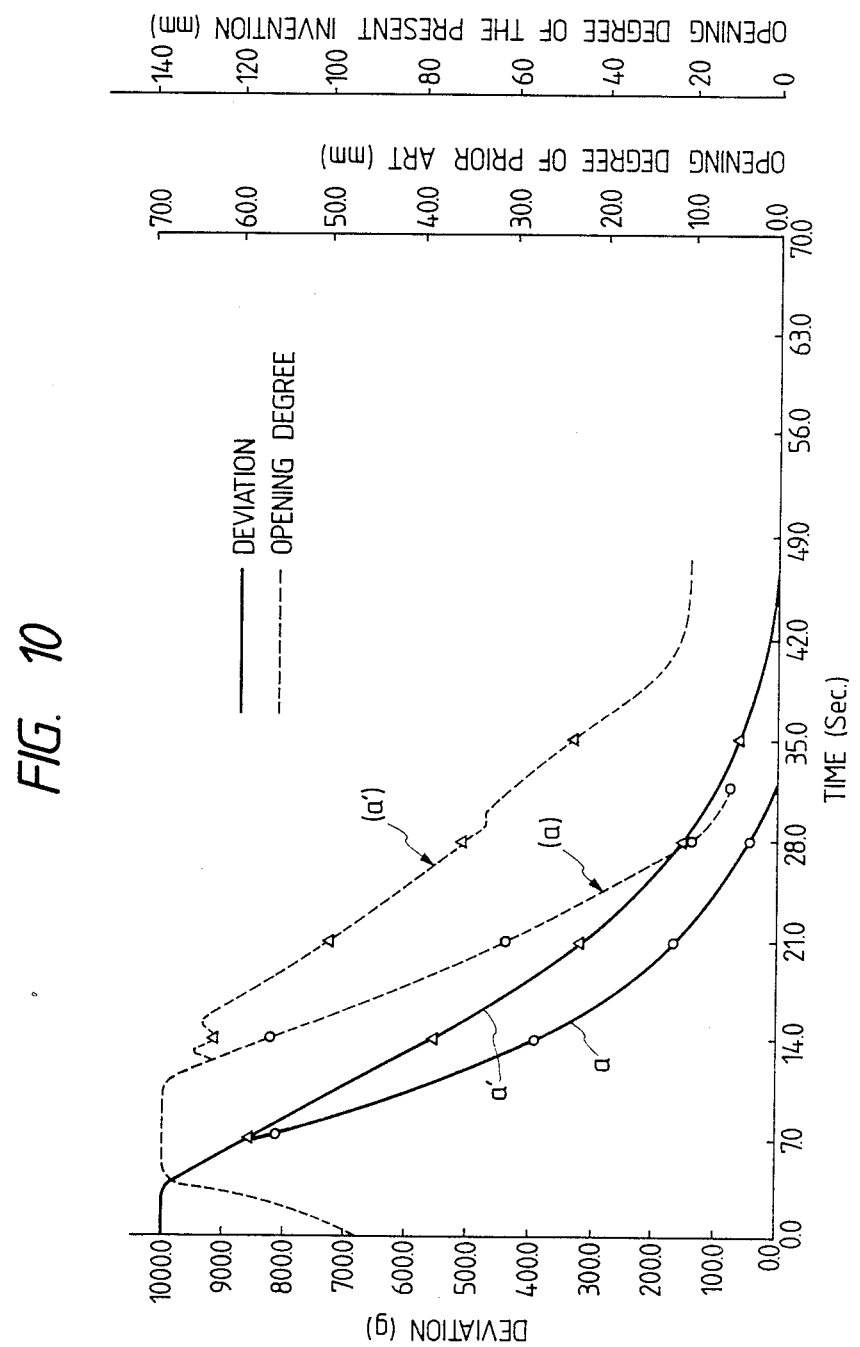
FIG. 10 is also a graphical representation showing the characteristic curves plotted with the results of experiments which have been performed according to the method of invention and the conventional method.

FIG. 10 is a graphical representation for comparison of the operation of one specific example of the apparatus of the second embodiment of the invention with the operation of the conventional apparatus using the conventional liquid flow control valve.

In the experiment, the detector capable of weighing 10 kg at maximum was used, and the accuracy of the load cell was 1/5000. The FCV (flow control valve) was position-controlled by the servomotor, and the measurement control device outputted position instructions.

FIG. 10 shows measurement characteristics provided when 1000 g was measured by the conventional apparatus and the apparatus of the invention which were equal in construction except for the liquid flow control valves. In the graphical representation of FIG. 10, measurement differences and FCV valve opening degrees are plotted on the vertical axis, and the measurement time on the horizontal axis. As is apparent from FIG. 10, in the case (marked with "0") where the flow control valve (a) according to the invention was used, the measurement was accomplished in thirty-one seconds on the other hand, in the case (marked with triangles) where the conventional flow control valve (a') was employed, the measurement took forty-six (46) seconds. The measurement accuracy of the conventional method was ±1.0 g, whereas that of the method of the invention was ±0.5 g.

The closed loop liquid and powder measurement control method of the invention performs fuzzy control, learning control or optical control of the liquid and powder flow control means. In the apparatus for practicing the method as is apparent from Japanese Patent Application No. 106412/1987, the measurement can be carried out with high accuracy over a wide range of measurement target values without being affected by the variation of flow speed attributed to disturbances. Also, the measurement can be accomplished in a short time independently of the measurement target value, with the result that the number of measuring devices can be decreased and the raw materials can be economically used. This system employs the above-described special flow control valve according to the invention, whereby the measurement time is reduced even more. Therefore, it goes without saying that the above-described effects can be equally obtained, and moreover the following effects are obtained according to the invention. The initial cost and maintenance cost are reduced because the number of measuring devices can be decreased as was described above. The apparatus is high in reliability, that is, it rarely goes out of order. Furthermore the amount of residual raw material is decreased, and the running cost can be reduced as much.

A third embodiment of the present invention will be described with reference to the drawings.

Figure 11:
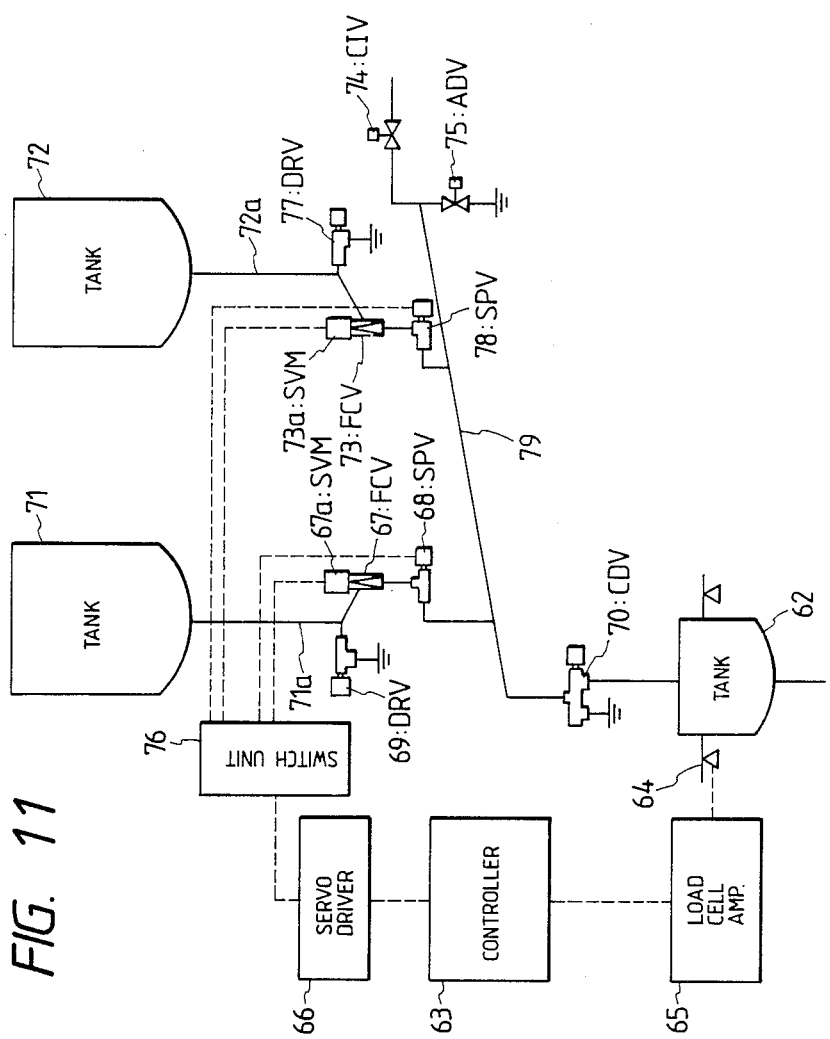
FIG. 11 is a diagram of a two-liquid measured mixing apparatus as a third embodiment of the present invention.

FIG. 11 shows an embodiment of the two-liquid measured mixing system. This system is constructed so that raw-material liquids from two tanks, which are supply tanks arranged on the upstream side, are sent to one tank as a liquid receiving tank arranged on the downstream side to thereby prepare a mixture liquid with cumulative metering of the two liquids.

The two upstream tanks 71 and 72 are connected to piping paths 71a and 72a to which are attached drain valves (DRVs) 69 and 77 and stop valves (SPVs) 68 and 78. The DRVs 69 and 77 are provided with special flow control valves (FCVs) 67 and 73 used in the present invention.

Figure 3C:
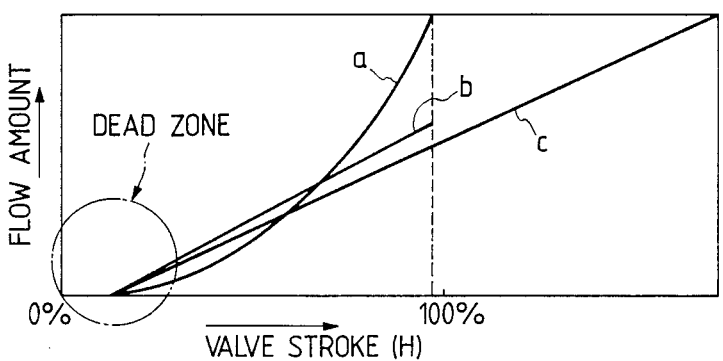

As shown in FIG. 3(c), each of the flow control valves (FCVs) 67 and 73 has such flow-rate characteristic that the rate of change in flow velocity is small and linear relative to the valve stroke. Each of the flow control valves (FCVs) 67 and 73 has such a structure as shown in FIGS. 5, 6(a) and 6(b).

Referring to FIG. 11, the piping paths 71a and 72a are connected to a common coupling pipe 79. The coupling pipe 79 is provided with a cleaning and disposal valve (CDV) 70 so that unadulterated liquid can be transported to the downstream tank 62. A cleaning initiating valve (CIV) 74 and an air duct valve (ADV) 75 are arranged on the upstream side of the coupling pipe 79. The CIV 74 can introduce a cleaning solution into the coupling pipe 79.

A load cell 64 is used as a detector for weighing the liquid and is associated with the downstream tank 62. The load cell 64 is connected to the measurement control unit 63 through a load cell amplifier 65.

The measurement control unit 63 is connected to the switching unit 76 through a servo-driver 66 and performs fuzzy control on the basis of the flow-rate characteristics of the FCVs 67 and 73, the actual amount of the liquid measured by the load cell 64 and the target value.

The switching unit 76 is connected to servomotors 67a and 73 for actuating the FCVs 67 and 73 and to SPVs 68 and 78 arranged on the two parallel liquid supply paths 71a and 72a, respectively. Instructions to actuate the servo-driver 66 controlled by the measurement control unit 63 are sent out from the switching unit 66 by which one of the two supplies is selected.

Figure 12:
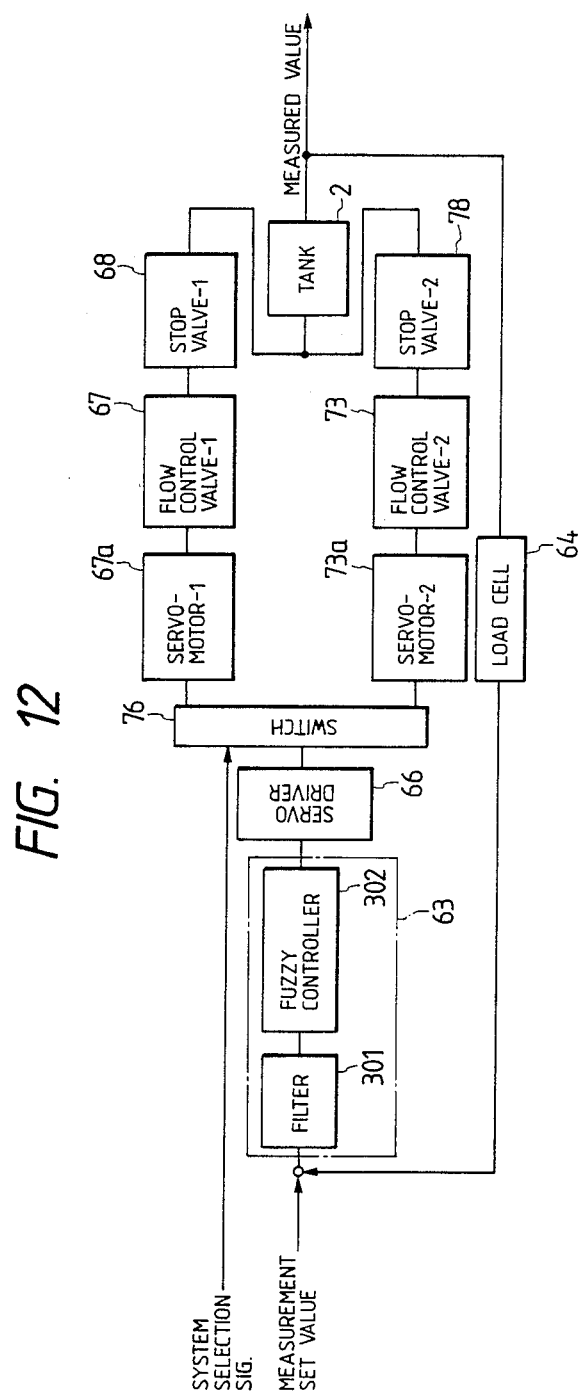
FIG. 12 is a control block diagram for explaining a multi-liquid measured-mixing apparatus of FIG. 11 according to the present invention.

The operational process in the liquid measured mixing apparatus thus constructed will be described with reference to FIG. 11 and also to FIG. 12 which is a control block diagram.

Manufacturing conditions (conditions in measuring of the liquid of the supply tank 71, the subsequent measuring of the liquid of the supply tank 11, and the like) are specified to a measurement control unit 63.

After measurement target values are established in the measurement control unit 63. DRVs 69 and 77 and a CDV 70 are switched to a measuring system line. When instructions to start measuring are given, positional instructions are sent from the measurement control unit 63 to a servo-driver 66 to open an SPV 68 and to open a FCV 67 to a predetermined opening degree. The servo-driver 66 drives a servomotor 67a to set a valve port of the FCV 67 in an instructed position thereby to adjust the opening degree to induce a flow of the raw material. At that time, the initial opening degree of the FCV 67 is calculated from the flow-rate characteristic of the valve and the measurement target value by a fuzzy control portion 302 (FIG. 12) of the measurement control unit 63 on the basis of fuzzy inference. As a result, transport of the raw material from the tanks 71 to the receiving tank 62 starts. The load cell 64 of the receiving tank 62 detects the weight of the transported raw material and feeds the detected value back to the measurement control unit 63 through the load cell amplifier 65.

Figure 4:
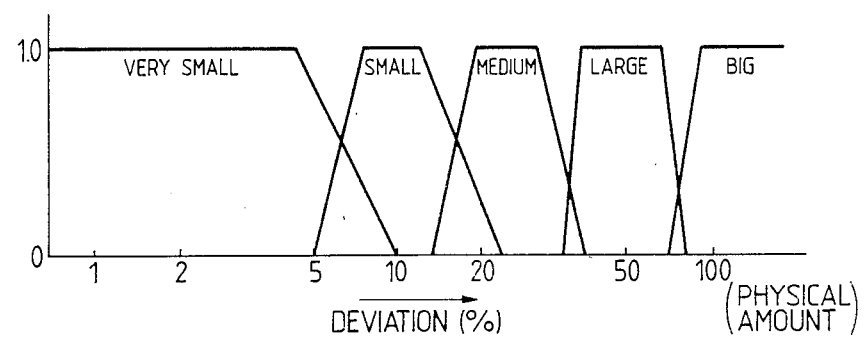
FIG. 4 is a diagram for a description of the membership function of fuzzy control.

A filter computing portion 301 of the measurement control unit 63 calculates the deviation between the measurement target value and the fed back actual value and also the change in the deviation with the passage of time. At the same time, it calculates values produced by applying low-pass filter treatment thereto. The fuzzy control portion 302 draws an inference from the calculated values based on fuzzy rules, so that the opening degree of the valve to produce suitable flow velocity in the next control cycle can be found. In this condition, the membership function used the fuzzy inference has the form as shown in FIG. 4, in which the axis corresponding to the physical quantities of the deviation and the change in deviation with the passage of time is divided into semi-logarithmic intervals so that the portions corresponding to small physical quantities are enlarged and a range of small physical quantity is enlarged in the semi-logarithmic scale. This achieves the double purpose of improving measuring accuracy and shortening the measuring time. If the deviation is large, good controllability is unnecessary, while if the deviation is small, it is necessary to improve the controlling accuracy. This rule applies to the temporal filtering function as follows. If the deviation is small the deviation in the primary filter is used to relax the dynamic characteristic of the measuring detector to thereby improve the measuring accuracy.

When the measured deviation becomes small after initiation of measuring, the opening degree of the FCV 67 is reduced to make the flow velocity small. When the measured deviation and the change in the measured deviation with time become so small that the measured deviation is not larger than a predetermined value, the measuring stops to close the SPV 68 and move the FCV 67 in the direction of full close. In this condition the flow velocity is so small that the quantity of residual inflow is also small. Accordingly, immediately after the measuring stops, the quantity of inflow becomes so small that measuring accuracy is improved independent of the change of flow velocity. Further, the FCV 67 having the flow-rate characteristic as represented by the curve c of FIG. 3(c) depends on the fuzzy inferential calculation. Accordingly, more accurate and more speedy measuring can be attained by the fuzzy control method compared with the prior art method using conventional flow control valves. Further, because the operation of the FCV 67 changes within the measurement control range corresponding to the measurement target value or the practical system in the same manner as the fuzzy control using the conventional flow control valve, the measuring can be made by one and the same measuring unit regardless of the target value, so that the measurement range can be enlarged within the static accuracy of the detection end. Further, because the operational pattern of the FCV 67 changes within the measuring time, the measuring can be made for a predetermined short time regardless of the measurement target value.

Next, the measuring of the liquid in the supply tank 72 is selected. Another FCV 73 provided for the supply tank 72 is selected by the switching unit 76. On the basis of the predetermined measurement target value, the same measurement control is made with measuring start instructions in the same manner as described above. The control function in the control unit is the same as described above, except that the output signal is switched by the switching unit 76 to be sent to the FCV 73 and SPV 78 as operational terminals.

The liquid is transported to the receiving tank 62 through a coupling pipe 79 which is common to all liquids from the supply tanks. The inner diameter of the coupling pipe 79 is so large that any residual part of the liquid in the pipe can drop naturally. To improve the measuring accuracy, the piping length of the coupling pipe 79 must be as short as possible. As an alternative method, the supply tank 71 and 72 may be respectively and separately connected to the receiving tank 62 without use of the coupling pipe. However, the method has an disadvantage in equipment in that the piping is complicated in construction when a plurality of liquids are received, because the size of the mixer tank 62 is finite so that the quantities of liquids to be mixed is limited. On the other hand, the method is advantageous in higher accuracy measurements in which the residual quantity within the coupling pipe 79 causes a serious problem.

Although the case has been described in which the flow-rate characteristic of the FCV 67 is equal to that of the FCV 73, measuring can be done on the basis for values of different linear characteristics with one and the same membership function and one and the same set of fuzzy rules.

Accordingly, highly-accurate, wide-range and short-time measuring can be attained regardless of the difference in the construction of the system, the characteristics of the valves, and the like.

While an example of additive metering (in which the liquid reserved in the mixer tank is measured) according to the present invention has been described above, there are additionally provided DRVs 69 and 77, a CDV 70 a CIV (cleaning start valve) 74 and an ADV (air duct valve) 75 which are attendant valves for cleaning, disposal and the like.

When, for example, the measurement of the liquid in the supply tank 71, the cleaning, and the subsequent measuring of the liquid from the supply tank 72 are carried out successively, the operation of the aforementioned valves is as follows. When only the piping should be cleaned after the measuring of the liquid from the first supply tank 71, the CDV 70 is turned to the disposal side to open the CIV 74 for the purpose of cleaning. At the same time, the ADV 75 and the SPVs 8 and 78 are closed. After the cleaning for a predetermined time, the CIV 74 is closed and the ADV 75 is opened. Then, the ADV 75 is closed for the next measurement of the liquid from the second supply tank 72.

Although the aforementioned embodiment has shown the case where two liquids are measured and mixed, it is to be understood that the present invention is not limited to the specific embodiment and that a large number of liquids may be measured in one and the same liquid-receiving tank. It may be, however, most suitable for the system that about eight flow control valves are controlled by one and the same measurement control unit.

Figure 13:
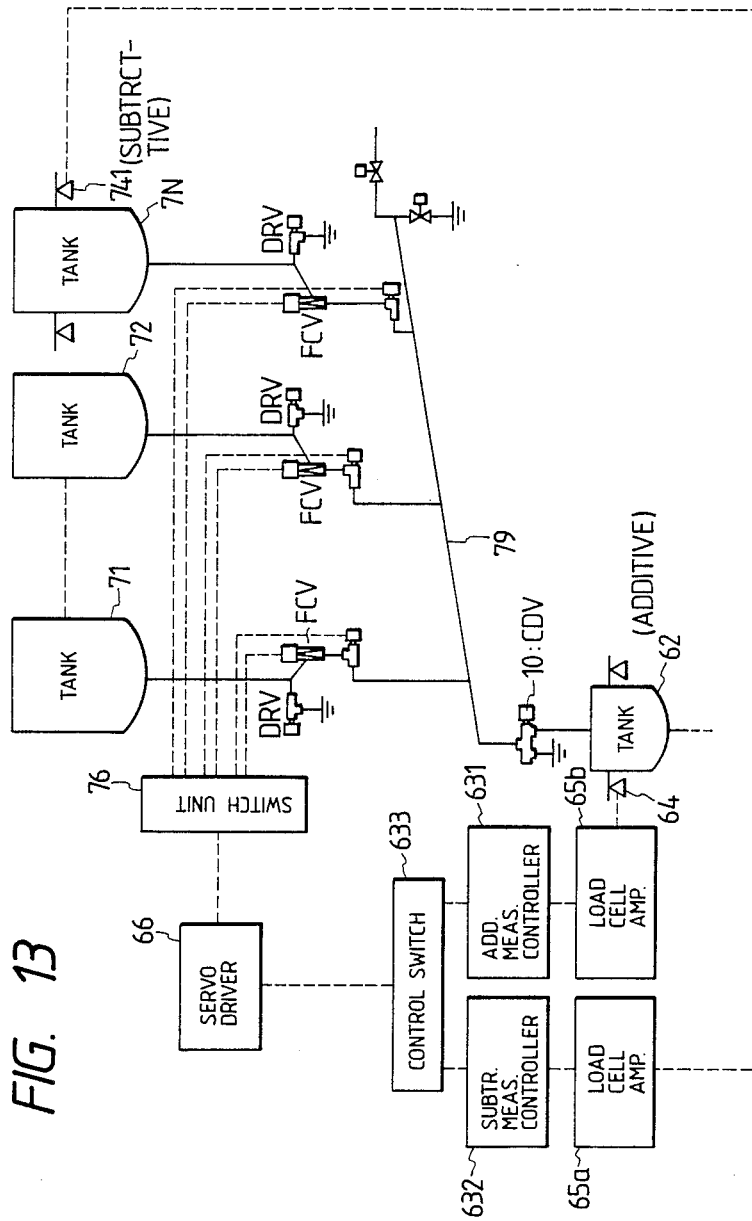
FIG. 13 is a diagram of an apparatus which is a modification of the apparatus of FIG. 11.

A modification of the present invention is described with reference to FIG. 13.

This modification is constructed by a combination of an additive measuring system in which the quantity of liquid is measured by a detector associated with the liquid receiving tank, and a subtractive measuring system in which the quantity of outflow liquid is measured by a detector associated with the supply tank. The description of the additive metering system will be omitted because the embodiment of FIG. 13 has the same constituent parts as those of the embodiment of FIG. 11 which are correspondingly referenced.

In the drawing, the N-th supply tank 7N is provided with a load cell 741 so that the tank serves as a measuring tank 7N.

The outflow quantity of the raw-material liquid from the tank 7N is measured by the load cell 741 and, at the same time the liquid is sent to the tank 62 acting as a liquid receiving tank and cumulatively measured by the load cell 64. The actual values obtained by the cumulative measuring system and the subtractive measuring system are fed back to the measurement control portions 631 and 682 through the load cell amplifiers 65a and 65b, respectively. The measurement control portions 631 and 682 calculate the deviations between the actual values and the measurement target values and the changes in the deviations with time and issue instructions to determine the opening degrees of the valves on the basis of the set of fuzzy rules. The two output signals of the measurement control portions 631 and 632 are switched by a control-type switching unit 633 to control the servo-driver 66.

According to the aforementioned construction, the measurement range can be further widened by the subtractive measuring for performing fine-scale measuring and the additive measuring for performing large-scale measuring of a large set target value.

Further, in the system for producing only a solution, attendant equipment, such as a stirrer, a warm-water circulator and the like, may be provided on the measuring tank so that measuring, mixing, reaction and the like can be carried out by one and the same tank.

Although the aforementioned embodiment has shown the case where the load cells are used as measuring detectors, the load cells may be replaced by any other detectors. Examples of the detectors used herein are pressure detectors, such as differential transmitters and the like, various kinds of level meters, and the like. The measurement range varies according to the static accuracy of the used detector.

SPECIFIC EXAMPLE 3

In the following, the result of metering carried out by the apparatus of FIG. 11 based on the aforementioned process is shown.

The metering unit used in this example is capable of measuring up to 10 kg. The accuracy of the load cell 64 is 1/5000. The FCVs (flow control valves) are positioned by the servomotor on the basis of positional instructions sent from the measurement control unit 63.

FIG. 3(c) shows the flow-rate characteristics of three kinds of flow velocity control valves, in which curves a and b represent conventional flow control valves, and a curve represents a specific flow control valve according to the present invention. After the valves were arranged in the system of FIG. 11, measuring was carried out without change of the control system.

Figure 14:
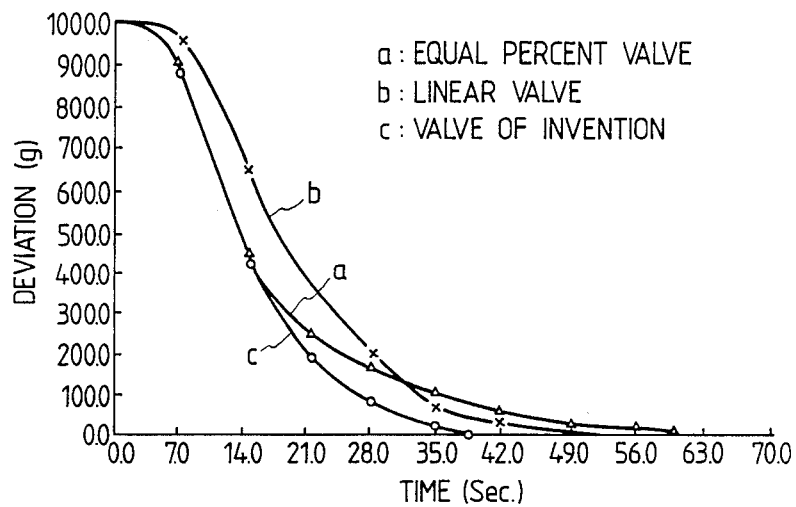

FIG. 14 shows the result of measuring up to 1000 g in the aforementioned conditions.

Of course, the operational patterns of the opening degrees of the flow control valves vary according to the kind of the valve. The valve c according to the present invention terminated the measurement in 40 seconds, whereas the conventional flow control valves a and b terminated their measurement in 60 seconds and 51 seconds, respectively.

The effect was estimated by an experiment in which the same liquid was used in the aforementioned system under the condition that the flow control valves were established to be different in flow-rate characteristic. Further, an experiment was conducted under the condition that the quantities of liquids in the upstream tanks were different. Consequently, highly-accurate, wide-range and short-time metering could be attained by one and the same measurement control unit and with the flow control valves according to the present invention compared with the conventional flow control valves.

Further, in this measuring system, flow velocity varies according to the residual quantity of the liquid in spite of the same opening degree. However, the residual quantity of the liquid was measured at each level, so that the measuring time and measuring accuracy were satisfactory regardless of the different operational patterns of the valve opening. On the other hand, with respect to the measurement range, the accuracy of ±0.5 g in the range of 1:100 could be obtained.

As described above, according to the liquid metrically mixing apparatus using fuzzy control and using the specific flow control valves of the present invention, (1) reduction of the number of measuring units can be reduced and (2) raw-material loss can be reduced to a remarkable degree compared with the prior art, by use of the measurement control unit which is not affected by the measurement target values, residual liquid quantities and liquid physical properties. Accordingly, a reduction of initial cost and a reduction of the number of maintenance steps due to the reduction in number of units can be attained. Further, reduction of running cost due to the reduction of raw-material loss can be attained.

A fourth embodiment of the present invention will be described with reference to FIG. 15.

Supply tanks 71 and 72 are filled with raw materials. A mixer tank 62 uses a load cell 64 as a detector. The liquid is finally distributed to two distribution tanks 91 and 92. After two liquids are measured a mixture thereof is distributed to downstream tanks 81 and 82.

Manufacturing conditions (conditions of measurement of the liquid of the supply tank 71, succeeding measurement of the liquid of the supply tank 72, and the like) are specified to a measurement control unit 63.

After measurement target values are established in the measurement control unit 63, drain valves (DRVs) 69 and 77 and a cleaning and disposal valve (CDV) 70 are switched to the measuring-system line. When instructions to start measuring are given positional instructions are sent from the measurement control unit 63 to a servo-driver 66 to open a stop valve (SPV) 68 and to open a flow control valve (FCV) 67 to a predetermined opening degree. The servo-driver 66 drives a servomotor to set a valve port of the FCV 67 in an instructed position to adjust the opening degree to induce a flow of the raw material. As a result of this, transport of the raw material from the supply tanks 71 to the mixer tank 62 starts.

The detector load cell 64 of the mixer tank 62 detects the weight of the transported raw material and feeds the detected value back to the measurement control unit 63 through a load cell amplifier 65.

The measurement control unit 63 computes a deviation between the actual value and the target value as well as a change of the deviation with the passage of time, etc. After computation, the measurement control unit 63 issues opening instructions (positional instructions) on the basis of a fuzzy control system to change the flow velocity.

As described above, the opening degree of the FCV 67 is controlled by a closed loop operating in a predetermined control cycle on the basis of the value observed by the detector load cell 64, so that the flow rate is controlled in a nearly continuously gradated scale.

When the measured deviation becomes small, the opening degree of the FCV 67 is reduced to make the flow velocity correspondingly small. When the measured deviation and the change of the measured deviation with time become so small that the measured deviation is no larger than a predetermined value, the measuring stops by closing the SPV 68 and moving the FCV 67 in the direction of full close. In this condition, the flow velocity is so small that the quantity of inflow is also very small. Accordingly, immediately after the measuring stops, the quantity of inflow becomes so much smaller that the measuring accuracy is improved independent of the change of flow velocity. Further, because the operation of the FCV 67 changes within the measuring range corresponding to the measurement target value or the specifics of the system, the measurement can be made by one and the same measuring unit regardless of the measurement target value, resulting in that the metering range can be enlarged within the static accuracy of the detection system. Further, because the operational pattern of the FCV 67 changes within the measuring time, the measuring can be made for a predetermined short time regardless of the measurement target value.

Next, the measuring of the liquid in the supply tank 72 is selected. Another FCV 73 which is provided to the supply tank 72 is selected by the switching unit 76. On the basis of the predetermined measurement target value, the same metrical control is performed with measuring-start instructions in the same manner as described above. The control function in the control unit 63 is the same as described above, except that the output signal is switched by the switching unit 76 to be sent to the FCV 73 and SPV 78 as operational terminals.

The liquid is thus transported to the mixer tank 62 through a coupling pipe 79 which is common to all liquids from the supply tanks. The inner diameter of the coupling pipe 79 is so large that any residual part of the liquid in the pipe can drop naturally. To improve measuring accuracy, the piping length of the coupling pipe 79 must be as short as possible. As another method, the supply tanks 71 and 72 may be separately and respectively connected to the mixer tank 62 without use of the coupling pipe 79. However, the method has an equipmental disadvantage in that the piping is complicated in construction when a plurality of liquids are received, because the size of the mixer tank 62 is finite.

While an example of additive metering (in which the liquid reserved in the mixer tank 62 is measured) has been described above, additionally illustrated in the drawing are DRVs 69 and 77, CDV 70, CIV (cleaning intake valve) 74 and ADV (air duct valve) 75 in the drawing represent attendant valves for cleaning, disposal and the like. When, for example, the measurement of the liquid in the supply tank 71 is followed by cleaning and then by the measuring of the liquid from the supply tank 72, the operation of the aforementioned valves is as follows. When only the piping should be cleaned after the metering of the liquid from the supply tank 71, the CDV 70 is turned to the disposal side to open the CIV 74 for the purpose of cleaning. At the same time, the ADV 75 and the SPVs 68 and 78 are closed. After the cleaning for a predetermined time, the CIV 74 is closed and the ADV 75 is opened. Then, the ADV 75 is closed for the next measurement of the liquid from the supply tank 72.

After the liquids from the supply tanks 71 and 72 are received, a mixing process starts After mixing conditions are predetermined, the mixed liquid is distributed to the downstream distribution tanks 91 and 92 in the proportion of predetermined quantities. The operational mode of the measurement control unit 63 is changed to the subtractive measuring function and then the bottom step valve of the mixer tank 62 is opened. As a result, FCVs 87 and 88 are filled with the liquid to thereby change the weight of the mixer tank 62. Accordingly, the measurement control unit 63 automatically starts its subtractive metering function after the current weight is reset to apparent zero just before the liquid will be distributed to the downstream tanks 91 and 92. The subtractive function is substantially the same as the additive function In other words, the measuring operation is made to a distributed quantity predetermined as a goal. In this embodiment, good measuring accuracy is attained by operating the FCV 87 for the measurement of the liquid and operating the FCV 88 for the distribution of the residual quantity of the liquid.

Figure 16:
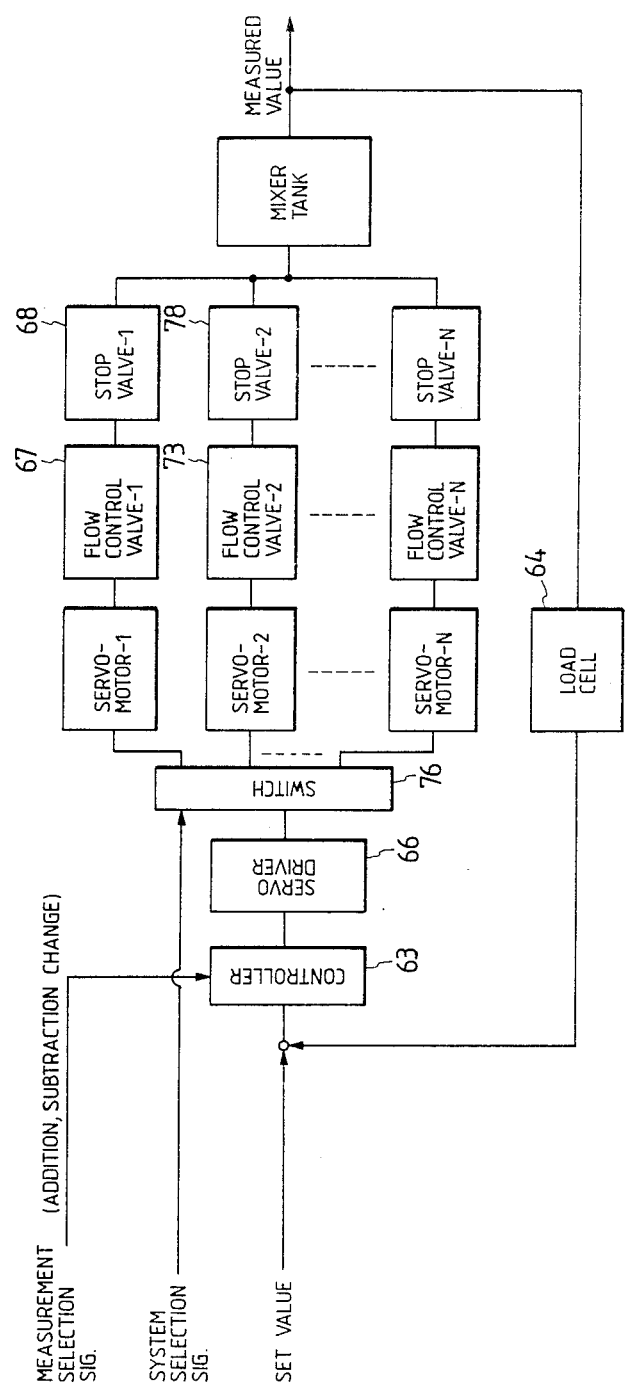
FIG. 16 is a block diagram of a control system used in the embodiment of FIG. 15 of the present invention.

FIG. 16 is a control block diagram.

In the present invention, the mixture measured in one mixer tank may contain various kinds of liquids. It may be, however, most suitable for the system that up to about either flow control valves are controlled by one and the same measurement control unit.

Although the embodiment has shown the case where the coupling pipe is used in the system, it is to be understood that the present invention is not limited to the specific embodiment and that is more highly accurate metering is required to solve the problem of the residual quantity in the piping, the plurality of pipes may be provided to be connected to respective liquid-receiving tanks.

Figure 15:
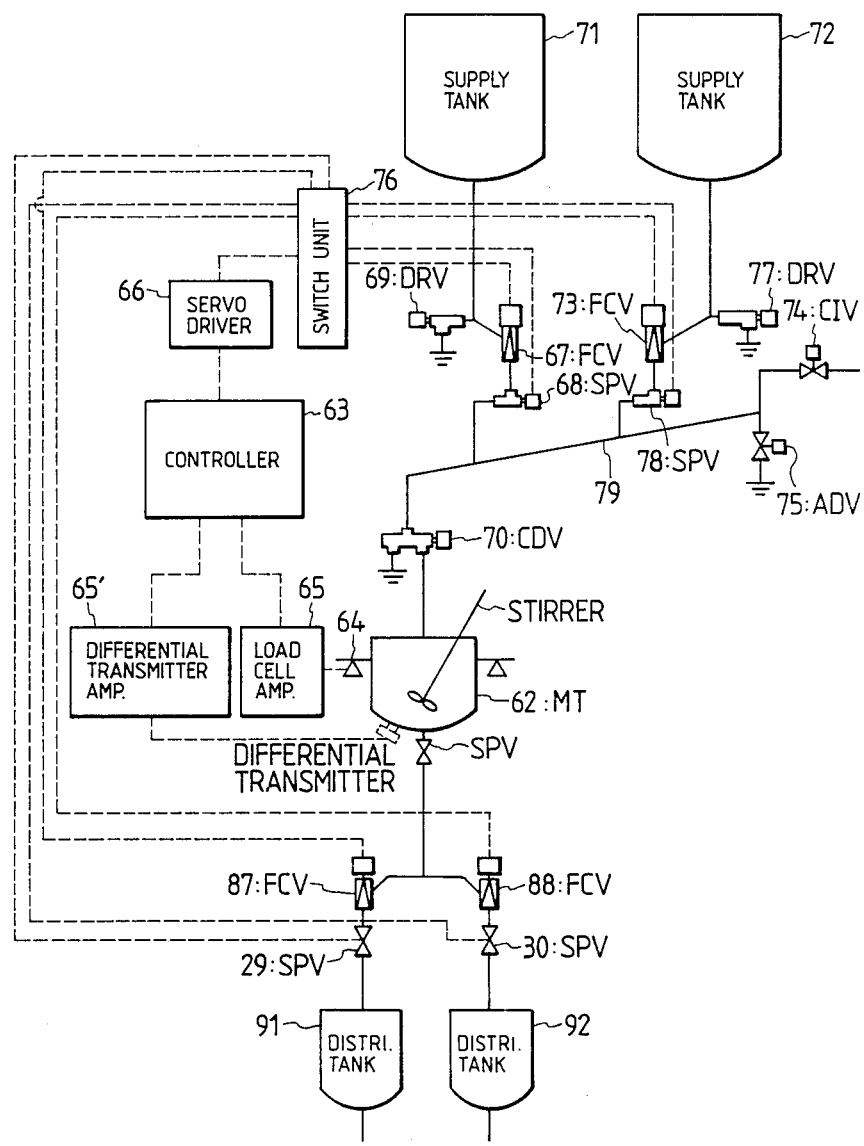
FIG. 15 is a flow chart of a liquid measured-mixing and distributing apparatus as a fourth embodiment of the present invention.

Because the geometric arrangement of valves for distribution is as shown in FIG. 15, the distance between the bottom valve of the mixer tank and the respective flow control valve must be as short as possible.

In the present invention, the load cell used as a detector for measuring may be replaced by other detectors. Examples of the detectors used herein are pressure detectors, such as differential transmitters and the like, various kinds of level meters, and the like. The metering range varies according to the static accuracy of the used detector.

SPECIFIC EXAMPLE 4

An example in the system of FIG. 15 will be described.

The mixer tank 62 is capable of being measured up to 10 kg. The accuracy of the detector load cell 64 is 1/5000. The FCVs (flow control valves) 69, 73, 87 and 88 are positioned by the servomotor on the basis of positional instructions sent from the metrical control unit 63 when the liquids are metered, respectively.

Figure 17:
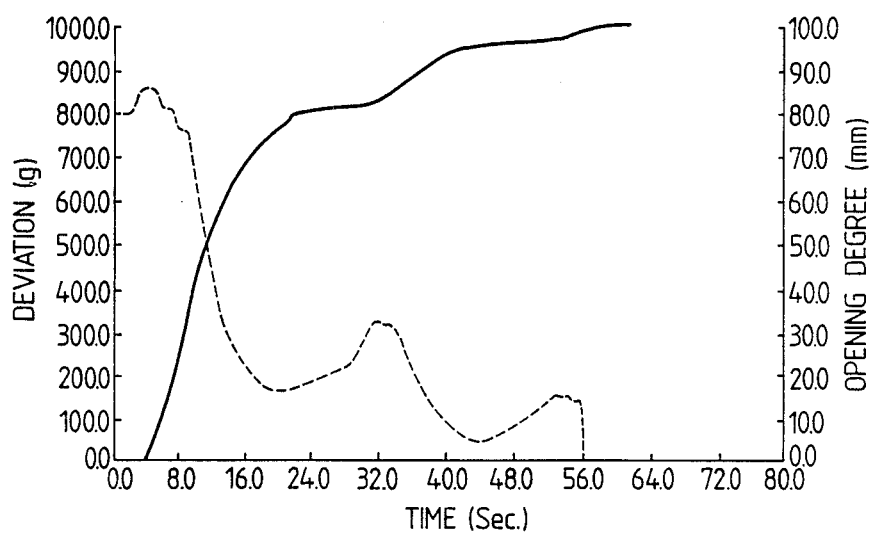
FIG. 17 is a graph of the measured deviation versus measuring time and valve opening degree versus measuring time showing an example of additive measuring according to the present invention.
Figure 18:
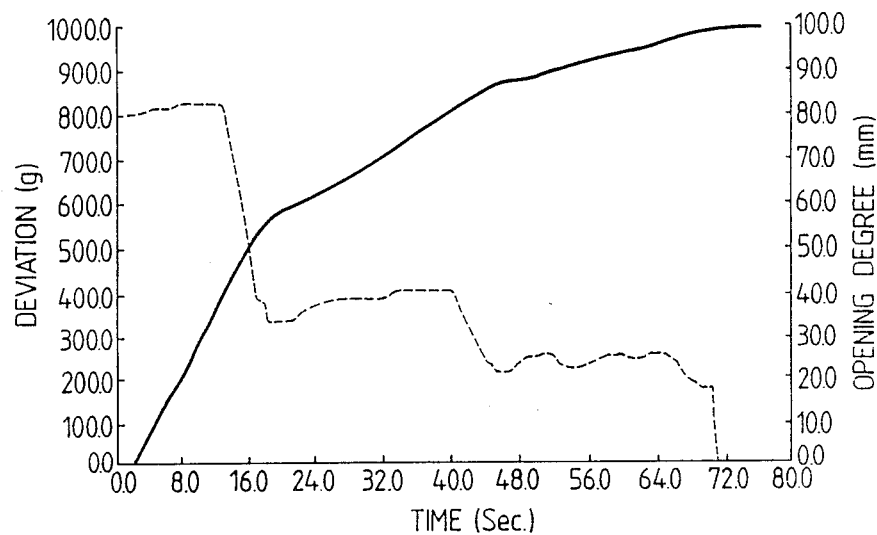
FIG. 18 is a graph of metering deviation versus metering time and valve opening degree versus metering time showing an example of subtractive metering according to the present invention.
Figure 19:
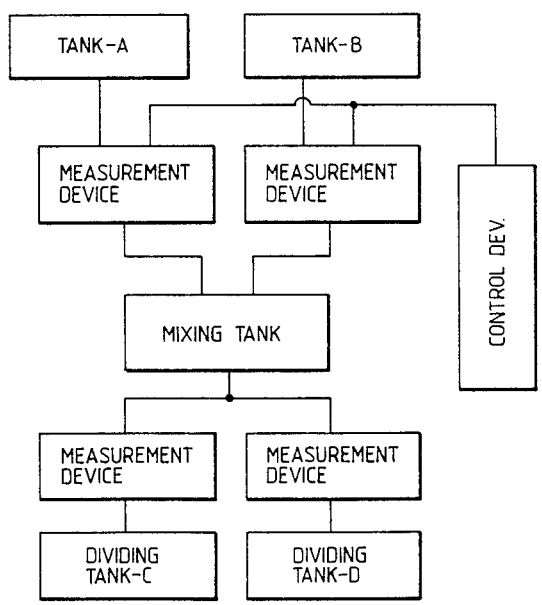
FIG. 19 is a flow chart of a conventional liquid metrically mixing and distributing apparatus.
Figure 20:
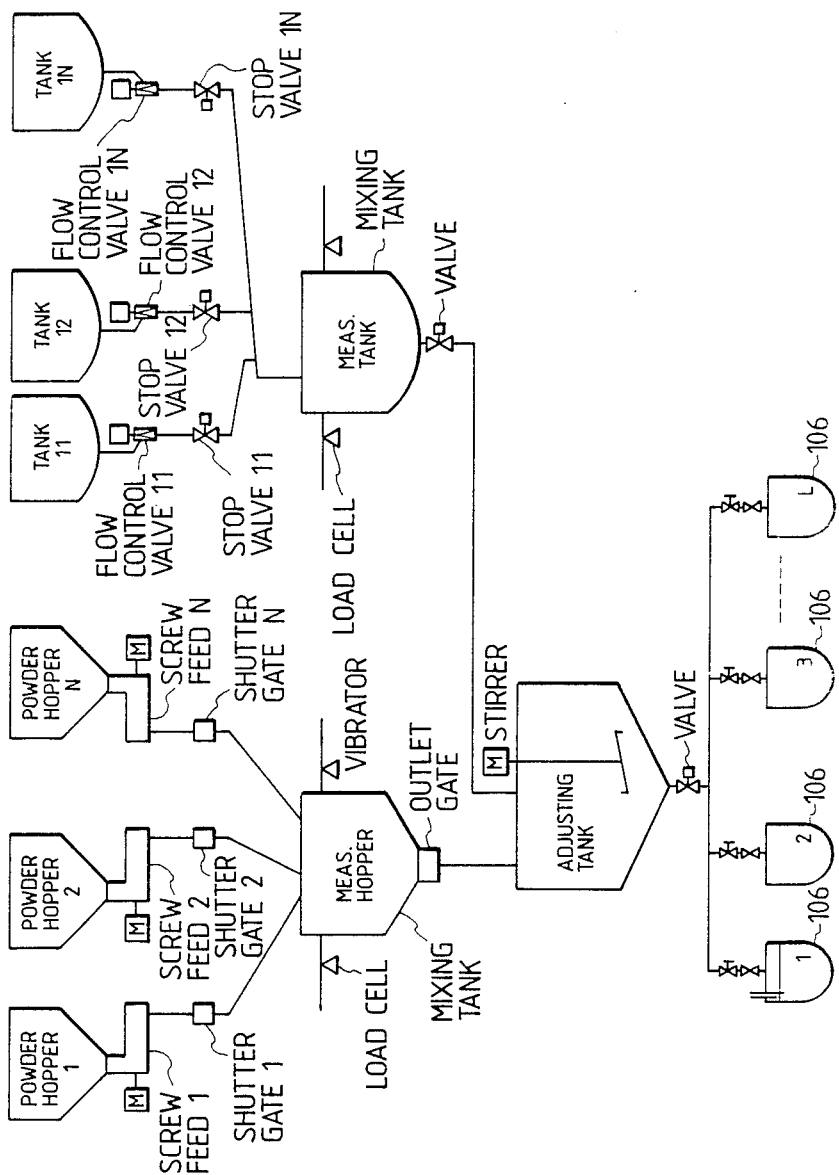
FIG. 20 is a flowsheet illustrating another liquid/powder measuring-mixing-dispensing system.

FIG. 17 is a measurement time plot in the additive measuring condition in which the liquid from the supply tank 71 is received. FIG. 18 is a measurement time plot in the subtractive measuring condition in which the mixed liquid is sent to the distribution tank 91. In short the drawings show results in the case where the measuring operation and the distributing operation were carried out according to the same control system by one and the same measurement control unit. Further the drawings show results in the case where two kinds of liquids from the supply tanks 71 and 72 were measured respectively to be 1000 g and then 1000 g of the mixture thereof was distributed to each of the distribution tanks 91 and 92.

Of course, the operational patterns of the opening degrees of the FCVs 67 and 87 changed, but highly-accurate measuring and distribution could be attained in a substantially equal time of measuring.

The effect due to the difference in properties of the liquids was estimated by an experiment in which the same liquid was used in the above-described system under the condition that the flow control valves 67 and 87 were established to be different in flow-rate characteristic. Further an experiment was conducted under the condition that the pressure heads in the upstream tanks were changed suitably. Consequently, highly-accurate, wide-range and short-time measuring and distribution could be attained by one and the same measurement control unit and with only a modification of the output portion thereof to be communicated with the flow control valves.

According to the present invention, the liquid measured mixing distributing apparatus cumulatively measures and mixes a plurality of liquids to prepare a liquid mixture and for metrically distributing the liquid mixture by closed-loop liquid measuring means in which a velocity of flow is allowed to change continuously. The apparatus comprises, a plurality of supply tanks respectively filled with liquids as raw materials: a mixer tank for mixing the liquids received from the supply tanks; a plurality of distribution tanks to which the mixed liquid in the mixer tank is distributed: a plurality of opening-regulated (flow-control) valves respectively associated with the supply tanks and the distribution tanks for restricting flow rates, each of flow-control vales having a dead zone where no flow rate is generated within a predetermined range: a detector arranged at the mixer for measuring liquids; a measurement control unit for performing fuzzy control on the basis of actual values measured by the detector and desiredly set target values so as to calculate the opening degrees of the respective flow-control valves; and a switching unit for switching the output of the measurement control unit to a predetermined one of the flow-control valves. Accordingly, the double function of a measured mixing apparatus and a metrically distributing apparatus can be attained by one and the same measurement control unit due to the fuzzy control of one closed loop. Good metrical distribution can be attained with highly-accurate, wide-range and short-time measuring, so that simplification of equipment, increase of manufacturing capacity and reduction of raw-material loss can be attained. Accordingly, economic effects due to reduction of initial cost maintenance cost and running cost can be attained.

A detailed description will now be given of the component elements of the fifth embodiment of the present invention.

(1) Supply containers: containers for storing liquids or powders to be measured. The capacity of the container should be at a scale fit for production. The residual amount of stock material remaining in the supply container is unrestricted. Theoretically the residue can be measured down to zero. Moreover, any liquid or powder can be measured down to zero as long as it has a physical property value allowing it to flow out and which is unaffected by the physical property value of the liquid or powder (e.g., viscosity, shape, grain size, etc.).

(2) Flow rate regulators: There are provided as many flow rate regulators as there are supply containers. In the case of liquids, the flow rate regulator is an opening regulating (flow control) valve and a flow velocity controller for changing the flow velocity of the supply powder over a wide range by changing the opening of the valve. A damper or screw feeder of a rotary type is suitable for such a regulator for powders.

Moreover, each flow rate characteristic of the flow rate regulator is such that no material flows out at about 0% of the rotation rate or opening but allows a flow rate to occur at about 10% of the maximum setting.

An AC servomotor, for instance, is employed to drive the flow rate regulator.

For a shut-off valve for stopping the flow of the liquid and the powder, a stop valve and a shutter gate are used respectively.

(3) Mixing container: a container having a capacity fit for the production scale. Mixable liquids and powders are cumulatively measured Provided that each of the transfer metering liquids or powders is washed away, an unmixable liquid or powder may be individually measured in the same container. In this case, they are mixed by means of an agitator.

(4) Measuring device: There is provided one measuring device for measuring the liquids and powders being supplied from the plurality of supply containers as well as measuring the mixed liquid dispensed from the mixing container.

The measuring device is installed on the mixing container side. Cumulative measuring, either by addition or subtraction is possible Use can be made of a tank measuring method by means of a load cell, differential pressure transmitter, level meter or the like. There are cases where the metering device is fitted to the mixing container or mounted thereon.

(5) Measurement control unit. A measurement control unit changes the flow velocity under closed loop control in such a manner that it starts with processing a high flow rate, computes a deviation from the measured value and a change of the deviation over time, and changes the flow rate under closed loop control, i.e., fuzzy control. Consequently, a wide range of metering is completed accurately in a very short time. If the control unit is equipped with a switching device, the plurality of liquids and powders and the resulting mixed liquid can be measured cumulatively (addition/subtraction) with one measuring device in one and the same container. The number of supply containers adequately designed therefor may be up to about eight, although the number can be reduced.

(6) Switching device: A switching device is designed to control the flow rate regulators for the plurality of supply containers and dispensing containers with one drive control device and it forms part of the measurement control unit. This arrangement makes it unnecessary to fit a measurement control device and a drive control device to each flow rate regulator.

(7) Moving unit. A moving unit conveys the mixing container. For a conveying means, use can be made of an unmanned conveyer vehicle, a conveyer or the like. In this case, the conveying function may be attached to the mixing container or otherwise the mixing container may be mounted on or dismounted from a separately provided moving unit.

(8) Dispensing containers. Dispensing containers receive the required amount of the mixed liquid and a suitable number of them are installed, depending on the producing system.

The above-described component elements are the basic ones of the present invention. The gist of the present invention is to arrange these elements to perform the following steps, namely the steps of: employing the measurement control unit for making the flow velocity vaiable under closed loop control: having the metering control unit perform the fuzzy control providing the moving unit for the mixing container and effecting measured-mixing and measured-dispensing with one measurement control unit.

Various attachment devices may be added for washing and other purposes while the liquid and the powder are measured according to the present invention. Spray balls for instance, are fitted to the supply and dispensing containers and a switching valve is installed in the middle of the piping. In addition warm water is circulated from a constant temperature bath for heat insulation.

The liquid/powder measuring-mixing-dispensing system cumulatively measures liquids and powders supplied from each of the plurality of supply containers, mixes the liquids and powders received therefrom in the mixing container, and dispenses the mixed liquid from the mixing container to the plurality of dispensing containers according to the present invention. The system comprises: (1) the flow rate regulators attached to the supply piping extending from the supply containers and the dispensing piping extending from the dispensing containers; (2) the measuring device for metering the liquids or powders being supplied from the supply containers and the mixed liquid being supplied from the mixing container to the dispensing containers, the measuring device being installed on the mixing container side (3) the measurement control unit for measuring a flow rate in each flow rate regulator under closed loop control by causing the flow rate to change with the fuzzy logical inference in proportion to each measured supply value and each measured dispensing value; and (4) the moving unit for moving the mixing container.

As a result first, since no coupling pipe is employed for the supply pipe of the container for use in storing each supply liquid, the facilities can be simplified. Secondly, the movable mixing container (measuring tank or hopper) allows the reception of liquids or powders from all of the supply containers and the distribution of the liquids or powers thus measured to all of the preparation tanks without fixed piping, whereby the size of the mixing container can be reduced and it affords the flexibility of the facilities. When versatile products are manufactured, accordingly, idle facilities on the mixing container side can be eliminated and further the addition of new facilities because of the alteration of the formulation can be minimized. Thirdly, the measuring cycle can be shortened by moving the mixing container, so that temporal variations are minimized by large-scale preparation. Fourthly, the mixing container (measuring tank or hopper) can be used as a preparation tank by attaching an agitator to the mixing container facing toward the supply tank. Fifthly, since the measured-dispensing and the measured-mixing is performed under fuzzy control using the same measurement control unit, it is possible to improve the measuring accuracy, the measurement time is shortened, loss of the mixed liquid is reduced and the facilities are simplified.

Referring now to the accompanying drawings the fifth embodiment of the present invention will be described in detail.

In this embodiment of the present invention, reference will be made to a mixing container equipped with a measuring device and a moving unit of a mobile type.

Figure 21:
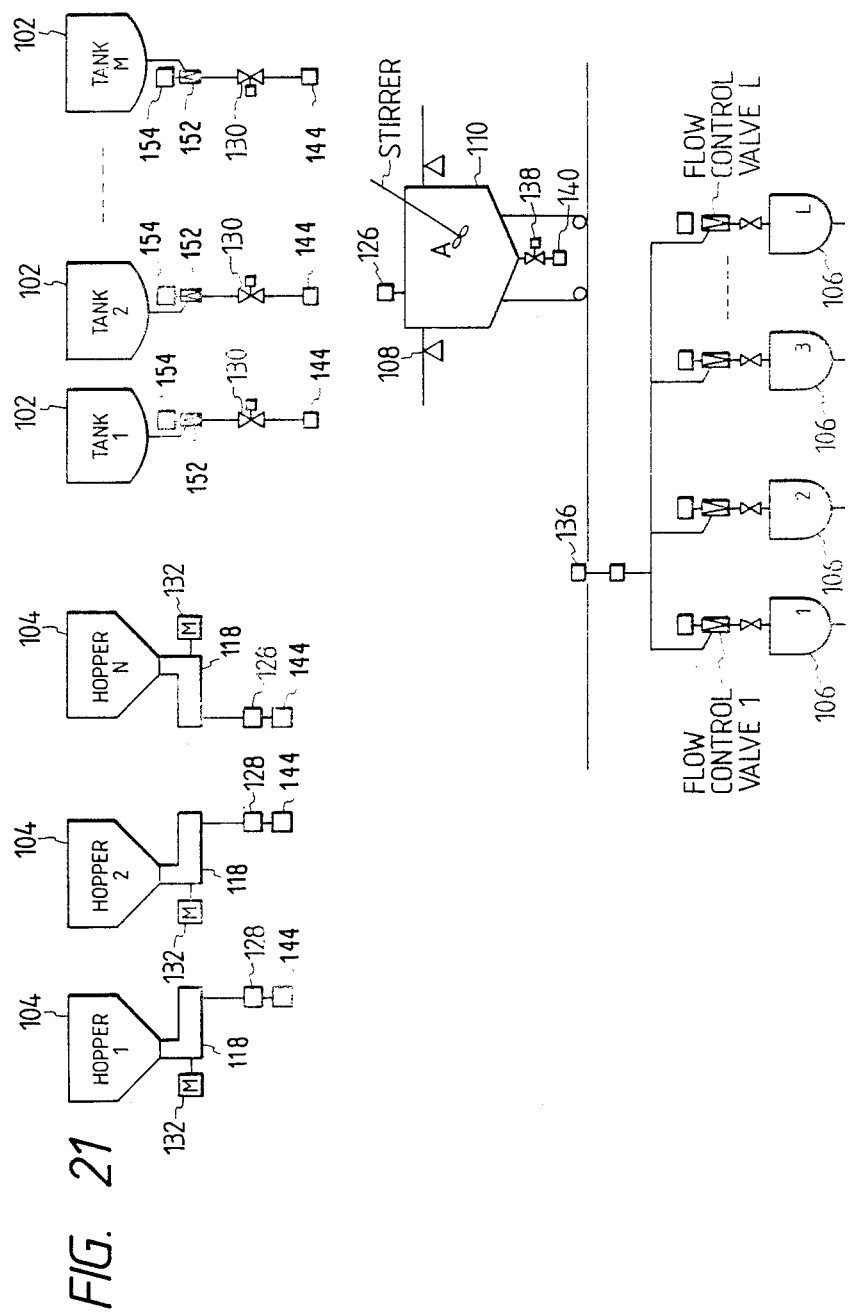
FIG. 21 is a flowsheet illustrating a liquid/powder metering-mixing-dispensing system of the fifth embodiment of the present invention.

As shown in FIG. 21, it is assumed there are M sets of liquid chemical supplying containers 102, N sets of powder chemical supply containers 104 and L sets of dispensing containers 106. The materials stored in the supply containers 102 and 104 are assumed free from mutual contamination. Even though these are many formulas for production, the total number of chemicals for use in each formula for production is not more than N+M. In the conventional production system, irrespective of being a moving or fixed type a chemical supply container and a measuring device are required for special use in each production formula in view of the measurement range, measuring time and measuring accuracy, even if the formula is the same. As a result, the number of sets exceeds M+N. However, a measurement control unit for controlling the flow velocity in a closed loop is employed and the measurement control unit is placed under fuzzy control according to the present invention. Accordingly, no consideration has to be given to the range of measurement, the measurement time and the measuring accuracy, so that M+N sets of supply containers are sufficient. Provided a measuring device 108 is free from the contamination of liquid or powder, the number of them may be set at an extremely small value determined by the conveyance capability.

In this case, the installation of one mixing container 110 and one metering device 108 (load cell) is assumed. At least M+N sets of supply containers 102 and 104 are deemed sufficient, whereas the number of mixing containers 110 equipped with the metering device 108 is determined in consideration of chemical preparation time and the production scale of the formulation. Consequently, more than one and not more than (M+N) sets of them may be required.

Figure 22:
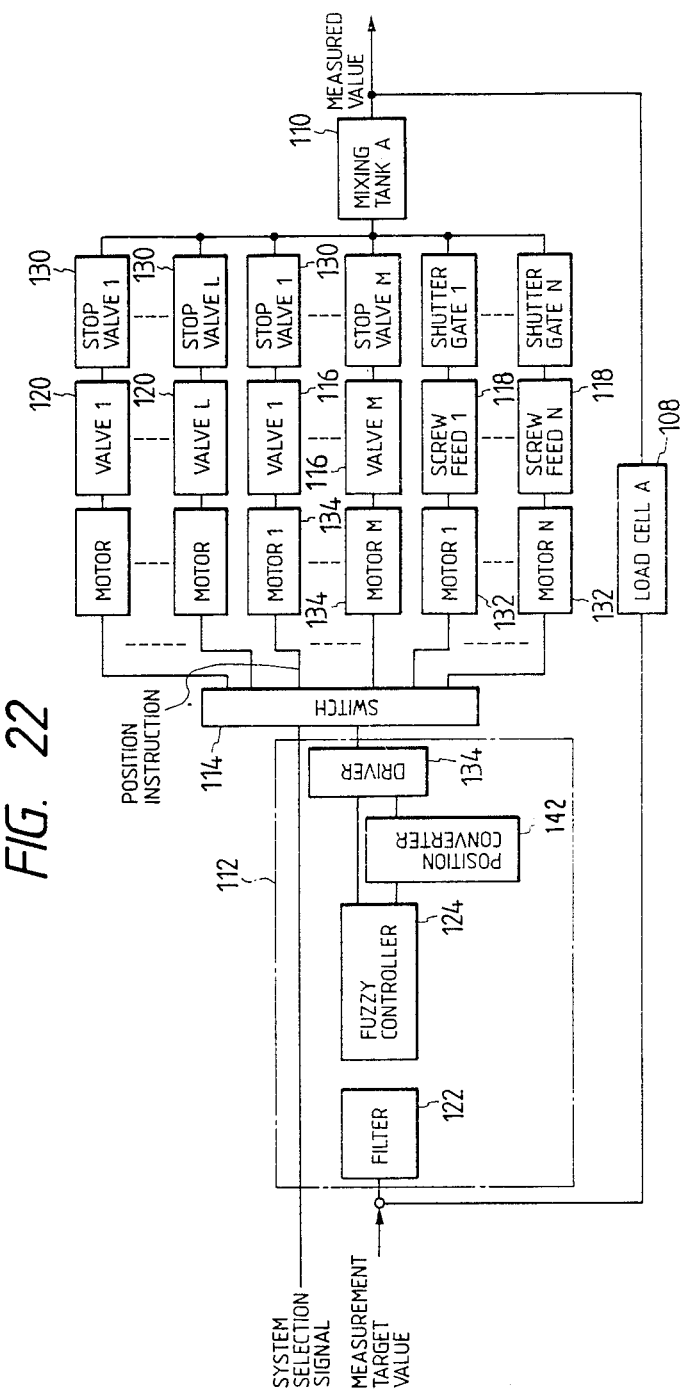
FIG. 22 is a block diagram of a closed loop control according to the present invention applicable to the apparatus of FIG. 21.

The measuring device is coupled to a measurement control unit 112 having a control block whose contents are shown in FIG. 22. The output of the measurement control unit 112 is selectively applied via the operation of a switching device 114 to a plurality M of opening regulating valves 116 or N screw feeders and L opening regulating valves 120 for the dispensing containers. More specifically, a number of chemicals and liquids containing the chemicals (M+N+L in total) are measured by the same control algorithm in the same mixing container 110.

Flow rate regulators represented by the M opening regulating vales 116, the N screw feeders 118 and the L opening regulating valves 120 have flow rate characteristics, respectively as shown in trace (a) of FIG. 3(c) or: i.e.. an equal percent characteristic for the opening regulating valves 116 and 120 which are completely shut in the proximity to the valve opening of 0%, whereas the outflow of the liquid is started in the neighborhood of the valve opening of about 10%.

The screw feeders 118 are capable of changing the powder feeding flow velocity over a wide range as the number of its rotations is varied.

The measurement control unit 112, including a filter computing section 122 and a fuzzy control section 124 performs the fuzzy control on the basis of the flow rate characteristics of the opening regulating valves 116 and 120 and the screw feeders 118, and also on the measured value and the set target value obtained from the measuring device 108 in order to control the openings of the opening regulating valves 116 and 120 and the number of rotations of the screw feeders 118.

The operational process of the liquid/powder metering-mixing system according to the present invention will now be described.

An instruction is given by a production control apparatus of a higher level to the mobile mixing container 110 as to moving the mixing container up to the position under the desired liquid or powder supply container 102 or 104 (e.g. the second storage hopper 104).

Another instruction is given by the production control apparatus of higher level via a coupling device as an attachment device of the supply container 104 so as to couple a second coupling device 144 of the second supply container 104 and a coupling device 126 of the mixing container 110 (metering tank). A further instruction is given to the measuring device (load cell 108) for measuring the powder chemicals being supplied from the second storage hopper 104 as the supply container. The switching device 114 as switched by a system selection signal makes the floW rate regulator (screw feeder 118) of the second storage hopper 104 thus selected and a shut-off valve (shutter gate 128) controllable by the measurement control unit 112.

When preparation for measuring are confirmed through the initial setting like this, an instruction for starting measuring is given from the higher level. Under the instruction for starting measuring, the switch device 114 is switched to select the supply system initially selected, i.e., the powder supply system of the second storage hopper 104 as set forth above and the second shutter gate 128 is opened. A second driving motor 132 is driven and rotated according to the instruction concerning the number of rotations given by a drive control section 134 of the measurement control unit 112 so that the screw feeder 118 transfers the powder at the predetermined speed. The flow of the material is thus started. The speed of the screw feeder 118 at that time is computed in the fuzzy control section 124 of the measurement control unit 112 in conformity with the flow rate characteristics of the screw feeder and the set measurement target value. The material in the storage hopper 104 thus starts being transferred to the mixing container 110. The measuring device 108 (load cell) of the mixing container 110 detects the weight of the material transferred and feeds back this value to the measurement control unit 112.

A deviation from the set target value and changes of the deviation in terms of time are computed from the supply powder metering value thus fed back in the filter computing section 122 of the measurement control unit 112 and the quantity passed through a low-pass filter is further computed therein. Inferential computation based on the fuzzy rules is then carried out to produce the speed of the screw feeder as an adequate flow velocity in the following control cycle.

When the measured deviation is reduced after the commencement of measuring, the number of rotations per unit time of the screw feeder decreases to minimize the flow velocity. As the measured deviation and the change of the measured deviation diminish, when the measured deviation becomes less than a certain value, the measurement is stopped and the shutter gate 128 moves toward the completely shut position. The flow velocity at this time is lowest and the inflow is very small. Consequently, the inflow after the suspension of the measuring becomes small, whereas the measuring accuracy improves without depending on the flow velocity fluctuation. Moreover, the transition of the screw feeder 118 having the flow rate characteristic (a) of FIG. 3(c) allows for about 10% leeway in the proximity to zero deviation in terms of the number of rotations based on the fuzzy inference computation. Accordingly, bad effects such as backlash are absorbed by means of the dead zone and the fuzzy control, even though rotational irregularities and mechanical backlash of the screw feeder are present, and thus accurate measurement can be implemented. Further, the operation of the flow rate regulator is changed by the set measurement target value or processing system, so that the measurement range is expanded because the same measuring device is useable for measuring, irrespective of the size of the target value. With respect to the measurement time, the operational pattern of the flow rate regulator changes to make similar short time measurements possible, irrespective of the size of the measurement target value.

A description will now be given of the measuring of liquid intended for mixture, for instance, The mixing container 110 moves up to the position under the liquid supply container 104 (e.g., the first tank 102) storing material intended for mixture and simultaneously the switching device 114 is switched to the first tank 102 so that the flow rate regulator (opening regulating valve 152) and a first one of the shut-off valves 130 are selected. The target value is preset and used for control similar to what has been described above in accordance with the measuring start instruction. In other words, the control function in the control unit is the same and the output signal applied to the screw feeder at the operational end and to the shutter gate needs only to be switched by the switching device 114 to the proper opening regulating valve 152 and the shut-off valve 130.

The control signal applied by the measurement speed instruction into a positional instruction corresponding to the opening before being sent out. In other words, the output of the fuzzy control section 124 is sent to a position conversing section 142 where it is converted into a positional instruction signal before being applied to the drive control section 154. The positional instruction signal is used to drive a first one of drive motors 134 so as to set the first opening regulating valve 120 to the specified position while regulating the opening. The flow of the material is thus brought about. In this case, the initial opening degree of the opening regulating valve 152 is computed in the fuzzy control section 124 as in the case of the aforesaid powder metering in such a manner that it is computed in accordance with the flow rate characteristics of the valve 152 and the measurement value based on fuzzy rules. The metering device 108 (load cell) attached to the mixing container 110 detects the weight of the material transferred and feeds back the value thus detected to the measurement control unit 112.

The deviation from the target value and the change of the deviation over time are computed from the measured supply liquid value thus fed back to the fuzzy control section 124 of the metering control unit 112 and the quantity passed through the low-pass filter 122 is further computed therein. The inferential computation according to the fuzzy rule is carried out in the fuzzy control section 124 on the basis of the value thus computed so that an opening providing an adequate flow velocity is obtained in the following cycle. In this case, the flow rate characteristics of the valve 116 are such that like those of the screw feeder 118, it is completely shut in the proximity of 0% opening, whereas the liquid starts flowing out in the proximity of about 10% opening. Based on the fuzzy reasoning, the opening of the valve changes within a range of about 10%. As a result, the mechanical backlash of the valve is absorbed so that accurate metering is implemented.

After the aforesaid operation is performed depending on the contents thereof to measure and mix the whole chemical composition within the range of formulas, it is dispensed to the downstream containers.

The plurality of L dispensing containers 106 are connected to the lower part of a pipe coupling device 136 in this embodiment. A bottom valve 138 of the mixing container 110 (metering tank) is controlled by a conveyance control device. When the bottom valve 138 is opened, the mixed liquid is dispensed though its coupler 140 to coupler 136 in an orderly process similar to what has been employed for the flow rate regulators. In this case, the same measurement control unit as shown in FIG. 22 is used to complete the dispensing of the liquid accurately for a short time.

Although the mixing container 110 (metering tank) is equipped with the measuring device and the mobile moving unit, the measuring device may be of a such a type that it is mounted on a measuring table and used for measuring a predetermined position while being conveyed by a unmanned conveyer If the moving unit is of a mobile type, an electrical connecting device such as a position sensor is required to be fitted to each coupling position as an attachment device.

Although reference has been made to the load cell as a detecting device for metering purposes, the same effect will be attained even if a detector of any other tank metering type is employed. If a differential pressure transmitter or the like is used for the metering tank or hopper the mixing container can be anchored to the mobile vehicle and therefore easily manufactured. It must be made to be unaffected by vibration.

Precision metering in a wider range becomes possible if the measurement control unit is provided with a subtractive measuring function by fitting an additional measuring device to the supply container (storage hopper or tank), in addition to the additive measuring in the mixing container.

Although liquids and powders are received by one reception tank (metering tank) and there measured in the present embodiment, groups of liquids and powders may be dispensed separately to the respective metering tank and hopper, respectively.

The liquid/powder measuring-mixing-dispensing system cumulatively measures liquids and powders supplied from each of the plurality of supply containers, mixes the liquids and powders received therefrom in the mixing container, and dispenses the mixed liquid from the mixing container to the plurality of dispensing containers according to the present invention. The system comprises the flow rate regulators attached to the supply piping extending from the supply containers and the dispensing piping extending from the dispensing containers, respectively. The measuring device measures the liquids or powders being supplied from the supply containers and the mixed liquid being supplied from the mixing container to the dispensing containers. The measuring device is installed on the mixing container side. The measurement control unit measures a flow rate in each flow rate regulator under closed loop control by causing the flow rate to change with the fuzzy logical reasoning in proportion to each measured supply value and each measured dispensing value. The moving unit moves the mixing container. Accordingly, precision measurement can be performed unaffected by flow velocity fluctuations due to disturbance and changes of physical property values of substances being measured. The measurement time can be shortened even over a wide measurement range, whereas the measured-mixing and measured-dispensing can be precisely and quickly implemented by one measurement control unit with the least liquid loss. Therefore, it becomes possible to simplify the production facilities reduce the number of measuring devices and increase the production capacity even in the case of large-scale facilities. At the same time, the improvement of product quality and the reduction of material loss are accomplished through large-scale preparation with the effects of initial cost reduction, maintenance cost reduction, running cost reduction and improvement of reliability.

Fuzzy inference will now be described. Fuzzy inference, used in a fuzzy control system, is intended to emulate control by a human operator. If the operator observes that the deviation between a target value and a measured value is large and a time rate variation of this deviation is small, then he would increase the flow rate which decreases the deviation more quickly. On the other hand, if he observes that the deviation is small but the time rate variation is somewhat large, then he would slightly decrease the flow rate. Fuzzy control is discussed by E.H. Mamdani in a technical article entitled, "Application of Fuzzy Algorithms for Control of a Simple Dynamic Plant" appearing in the Proceedings of IEEE, Vol. 121, 1974 at pages 1585-1588 and by L.A. Zadeh in a memorandum entitled, "Theory of Fuzzy Sets", Memo No. ERL-M502 Electronic Research Lab., University of California, Berkeley (1975).

Figure 23:
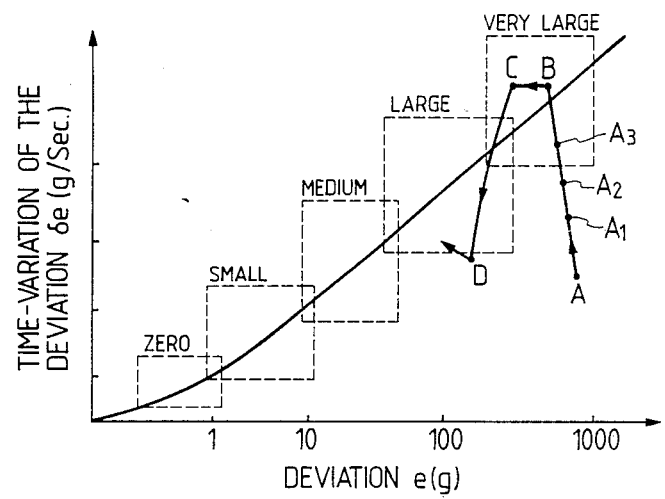
FIGS. 23 through 26 are graphs used for an explanation of control by fuzzy inference.

In FIG. 23 is plotted the deviation e (here the difference between the target weight and the actual measured weight) as a function of the time variation $\delta e$ (here the difference of the deviation e between the present and the past measuring cycles). If the measured deviation e and the measured time variation $\delta e$ fall within a balance zone (enclosed by a dashed line). then the current flow rate is appropriate in view of the current deviation so that the valve opening or the like is not required to be changed. Rather than performing an exact arithmetic computation, however, the variables are designated by "vague" variables such as very small small, medium large and very large. The "zero" balance zone may be associated with the dead zone of the valve.

If the variables are designated by these vague variables and by membership functions and if a control method is defined by "if-then" rules, fuzzy measurement control becomes possible. A fuzzy rule is generally expressed in the form of: if e is A and $\delta e$ is B. then $\delta u$ is C. In the present invention, e is the deviation, $\delta e$ is the time variation of the variation and $\delta u$ is the time variation (between control cycles) of a quantity controlling the flow such as the amount of opening of the control valve. The variables A, B and C in the rules are likewise defined by the vague variables, very small, small, etc.

Figure 24:
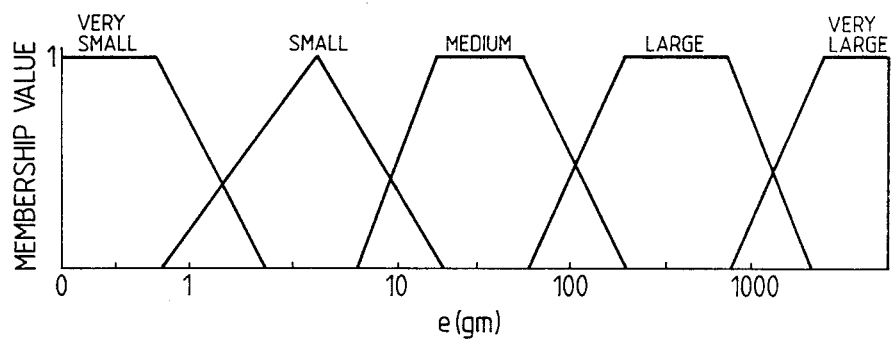

The membership functions are defined for each of the deviation e, the time variation of the deviation $\delta e$ and the time variation of the control quantity $\delta u$. Such a membership function for the deviation e (in units of grams) is plotted in FIG. 24. The vertical axis is the membership value a membership function varying between 0 and 1. If the measured deviation is 3 gm, then the deviation at the current measuring cycle is determined to be "small". Similar membership functions must be created for $\delta e$ and $\delta u$.

Figure 25:
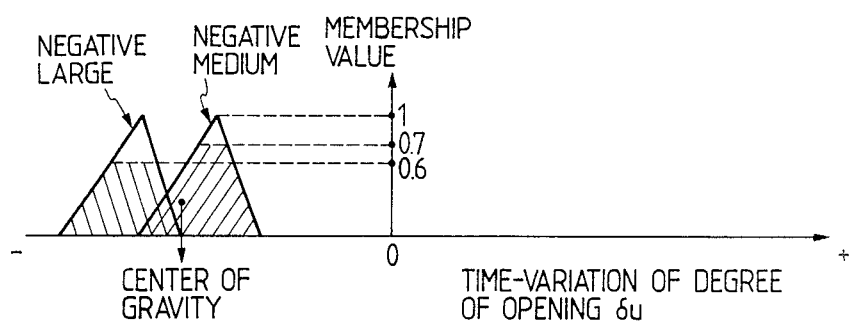

For fuzzy control, a number of fuzzy rules are defined beforehand. For example, a first rule is that if e is small and $\delta e$ is large, then $\delta u$ is negative large; and a second rule is that if e is small and $\delta e$ is medium, then $\delta u$ is negative medium Other rules become apparent from FIG. 23. When each of e and $\delta e$ falls in only one zone of the vague variables, then a single fuzzy rule using those vague variables is used to obtain the operation quantity $\delta u$. If, however, the observed quantity falls in two zones of vague variables two fuzzy rules for the observed quantity must be used with the membership values acting as weights in combining the "then" values of the operation quantities $\delta u$. For instance, FIG. 25 is a diagram used for obtaining the control quantity $\delta u$. Assume that e has a membership value 0.8 in the small zone, and $\delta e$ has a membership value 0.6 in the large zone and value 0.7 in the medium zone. Further, providing that fuzzy rules are (1) if e small and $\delta e$ is large, then $\delta u$ is negative large and (2) if e is small and $\delta e$ is medium, then $\delta u$ is negative medium. In this case, a membership value of $\delta u$ is determined as the smaller one of values of e and $\delta e$ (other selections are possible). Accordingly, the membership value of $\delta u$ is 0.6 when rule (1) is used, and 0.7 when rule (2) is used. From the membership values $\delta u$ is obtained by calculating, for example, the center of gravity of the area hatched in FIG. 25.

Figure 26:
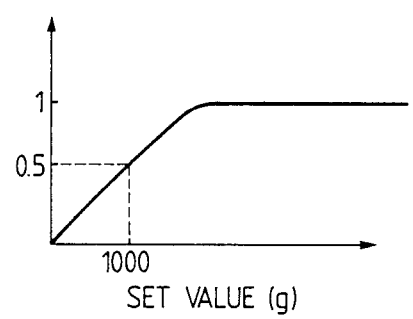

An initial opening degree of the valve is determined by a membership function as shown in FIG. 26. For example, when the set value is 1000 g, a membership value corresponding to the set value is 0.5 from FIG. 2. The maximum opening degree of the valve is set at 70.0 mm based on the flow-rate characteristics of the valve, so that the initial opening degree of the valve is set at $70.0 \times 0.5 = 35$ mm. The fuzzy control is not initially conducted for a while (wasted time). Since it takes a time to transfer the liquid from a supply tank to a measurement tank, if the fuzzy control is conducted immediately after initiating the measurement, the opening degree of the valve may be increased excessively. Accordingly, the fuzzy control is not conducted for the wasted time, which is within 0-9.9 seconds.

In the measurement, fuzzy rules used are as follows:

(1) If deviation e is very large and its time variation $\delta e$ is medium, then the time-variation of opening degree $\delta u$ is positive medium, (2) If e is very large and $\delta e$ is large, then $\delta u$ is positive small, (3) If e is very large and $\delta e$ is very large, then $\delta u$ is zero, (4) If e is large and δe is very large, then δu is negative small, (5) If e is medium and δe is very large, then δu is negative medium, (6) If e is medium and δe is large, then δu is negative small, (7) If e is large and δe is large, then δu is zero, (8) If e is large and δe is medium, then δu is positive small, and so on.

At point A in FIG. 23, fuzzy rule (1) is used so that δu is increased. At point $A_1$ in FIG. 23, fuzzy rules (1) and (2) are used so that the opening degree further increases. At point $A_2$ in FIG. 23, fuzzy rule (2) is used. At point $A_3$ in FIG. 23, fuzzy rules (2) and (3) are used. At point B in FIG. 23, fuzzy rule (3) is used so that the opening degree of the valve is not varied. At point C in FIG. 23, fuzzy rules (3) and (4) are used so that the opening degree of the valve is decreased. Between points C and D in FIG. 23, some fuzzy rules are used as between points A and B. At point D in FIG. 23, fuzzy rule (8) is used so that the opening degree of the valve is increased.

What is claimed is:

1. A closed loop measuring apparatus, comprising:
   a supply tank containing a stock material;
   a motor;
   a flow regulating valve attached to an outlet of said tank and having a linear stroke controlled by an operation of said motor, said valve providing a flow rate therethrough of said stock material which is substantially linear with said stroke and which is finely controlled over an entire range of flow rates between a closed position of said valve to a fully open position;
   a detector for measuring a quantity of said stock material transferred through said valve; and
   a control unit receiving an output of said detector and a measurement target value and controlling said motor in a successive closed loop operation cycle.

2. A closed loop measuring apparatus as recited in claim 1, wherein said control unit operates according to fuzzy inference upon said measured quantity and said measurement target value.

3. A closed loop measuring apparatus as recited in claim 2, wherein said stock material is a liquid and said valve is a liquid valve.

4. A closed loop measuring apparatus as recited in claim 1, further comprising:
   a plurality of said supply tanks storing respective stock materials;
   a plurality of said motors;
   a plurality of said flow regulating valves controlled by respective ones of said motors and providing a flow rate therethrough of a respective one of said stock materials which is substantially linear with said stroke of a respective one of said valves; and
   a measuring tank receiving said stock materials flowing through said valves and having said detector attached thereto;
   wherein said control unit controls each of said motors.

5. A closed loop measuring apparatus, comprising:
   a supply tank containing a stock material;
   a motor;
   a flow regulating valve attached to an outlet of said tank and having a linear stroke controlled by an operation of said motor, said valve providing a flow rate therethrough of said stock material which is substantially linear with said stroke;
   a detector for measuring a quantity of said stock material transferred through said valve;
   a control unit receiving an output of said detector and a measurement target value and controlling said motor in a successive closed loop operation cycle, wherein said control unit operates according to fuzzy inference upon said measured quantity and said measurement target value;
   wherein said stock material is a liquid and said valve is a liquid valve;
   wherein said motor has a feed screw; and
   wherein said valve comprises:
   a valve casing having a central axis and comprising an inlet side casing and an outlet side casing;
   a valve head with a circular truncated-cone shaped working face for engagement with said valve casing a portion between said inlet and outlet side casings and a tapered portion extending from said working face in a direction of said outlet side casing and having a cross section tapering away from said working face, said tapered portion being disposed within said outlet side casing in a fully closed position of said valve and within said inlet side casing in a fully open position of said valve; and
   a valve shaft attached to said valve head and extending along said central axis;
   and wherein said apparatus further comprises:
   a linearly guided coupling board on which is mounted said valve shaft and is moved by said feed screw, whereby said coupling board and said valve shaft move as a unit.

6. A closed loop measuring apparatus as recited in claim 5, wherein said outlet side casing is substantially circular and wherein an area of said cross section of said tapered portion of said valve head decreases substantially linearly with a distance along said central axis from said working face.

7. A closed loop measuring apparatus as recited in claim 6, wherein said tapered portin is cone shaped.

8. A closed loop measuring apparatus comprising:
   a supply tank containing a stock material;
   a motor;
   a flow regulating valve attached to an outlet of said tank and having a linear stroke controlled by an operation of said motor, said valve providing a flow rate therethrough of said stock material which is substantially linear with said stroke;
   a detector for measuring a quantity of said stock material transferred through said valve; and
   a control unit receiving an output of said detector and a measurement target value and controlling said motor in a successive closed loop operation cycle;
   further comprising:
   a plurality of said supply tanks storing respective stock materials;
   a plurality of said motors;
   a plurality of said flow regulating valves controlled by respective ones of said motors and providing a flow rate therethrough of a respective one of said stock materials which is substantially linear with said stroke of a respective one of said valves; and
   a measuring tank receiving said stock materials flowing through said valves and having said detector attached thereto;
   wherein said control unit controls each of said motors;

wherein each of said motors has a rotary output shaft;
wherein each of said valves comprises:

a valve casing having a central axis and comprising an inlet side casing and an outlet side casing;

a valve head with a circular truncated-cone shaped working face for engagement with said valve casing in a portion between said inlet and outlet side working face in a direction of said outlet side casing and having a cross section tapering away from said working face, said tapered portion being disposed within said outlet side casing in a fully closed position of said valve and within said inlet side casing in a fully open position of said valve; and a valve shaft attached to said valve head and extending along said central axis;

and wherein said apparatus for each of said motors and each of said valves further comprises:

a linearly guided coupling board on which is mounted said valve shaft and is moved by said output shaft, whereby said coupling board and said valve shaft move as a unit.

9. A closed loop measuring, mixing and distributing apparatus, comprising:

a plurality of supply containers containing respective raw materials;

a mixing container for receiving and mixing said raw materials from said supply containers to form a mixture;

a plurality of dispensing containers receiving said mixture from said mixing container;

a plurality of flow regulators disposed in respective flow paths between said supply containers and said mixing container and in respective flow paths between said mixing container and said dispensing containers, each of said flow regulators providing a plurality of non-zero flow rates of material therethrough:

a detector associated with said mixing container for detecting an amount of flow of material into and out of said mixing container:

a control unit receiving an output of said detector and responsive to target values associated with each of said flow regulators for controlling an opening degree of each of said flow regulators according to fuzzy inference: and a switching unit for switching an output of said control unit to a selected one of said flow regulators.

10. An apparatus as recited in claim 9, wherein each of said flow regulators has a dead zone in which no material flows therethrough within a range of operation of an operable part of said each flow regulator.

11. An apparatus as recited in claim 9, further comprising means for moving said mixing container between different ones of said flow paths.

* * * * *